June 30, 1970     J. E. BAYATI     3,517,509

INTEGRATED AIRCRAFT PROPULSION CONTROL SYSTEM

Filed Aug. 26, 1968     12 Sheets-Sheet 1

INVENTOR.
JAMAL E. BAYATI
BY
ATTORNEY

INVENTOR.
JAMAL E. BAYATI

BY Roegm Pitts

ATTORNEY

INVENTOR.
JAMAL E. BAYATI

INVENTOR.
JANAL E. BAYATI

INVENTOR.
JAMAL E. BAYATI

INVENTOR.
JAMAL E. BAYATI 3,517,509
INTEGRATED AIRCRAFT PROPULSION
CONTROL SYSTEM
Jamal E. Bayati, Placentia, Calif., assignor to North
American Rockwell Corporation
Filed Aug. 26, 1968, Ser. No. 755,408
Int. Cl. F02k 3/12, 3/02
U.S. Cl. 60—226      24 Claims

ABSTRACT OF THE DISCLOSURE

A control system for controlling a multimode aircraft propulsion system having adjustable air inlet and bypass ducting, a fan type primary gas engine having an adjustable exhaust nozzle area, and at least one jet type auxiliary gas engine having an adjustable after-burner mode. Manually-operable signalling means generates a command signal indicative of a selected thrust condition, and a plurality of preselectively-thresholded closed loop controllers respond to preselected levels of the command signal to operate and control the primary and auxiliary gas engines alternatively and concomitantly, for providing a wide range of thrust conditions over both subsonic and supersonic flight conditions.

CROSS-REFERENCE TO RELATED APPLICATION (1) U.S. application Ser. No. 592,086 filed Nov. 4, 1966, by Jack I. Hope for Method and Apparatus for Aircraft Propulsion.

(2) U.S. application Ser. No. 557,275 filed June 13, 1966, by Louis C. Young for Self-Restarting Supersonic Inlet.

BACKGROUND OF THE INVENTION

As the flight profiles over which aircraft are desired to be operated are extended, the required range of speed and altitude conditions of safe flight is extended. Variations in payload conditions, in combination with such required range of speed and altitude conditions, tend to impose wide ranges of thrust performance on the aircraft propulsion system. These performance ranges require not only extremes of steady-state thrust performance under both subsonic and supersonic flight conditions, but also require stable and rapid dynamic response to required changes in thrust, particularly in the case of high-performance, multimission military aircraft.

The fulfillment of the requirements for a high performance integrated aircraft propulsion system have been met in the integration of a fan type primary gas engine with auxiliary turbojet engines, as described in copending U.S. application Ser. No. 592,086 filed Nov. 4, 1966, by Jack I. Hope, assignor to North American Aviation, Inc., now known as North American Rockwell Corporation, assignee of the subject invention. Such integrated propulsion system combines at least one turbojet type auxiliary gas engine in a satellite arrangement about a turbofan type primary gas engine, for efficiently achieving the superior subsonic cruise performance of a turbofan type engine with the superior supersonic and acceleration performance of a turbojet engine.

The optimum utilization of such integrated propulsion means requires the rapid and careful matching and control of the propulsion system components to a selected aircraft mission. Such control function is too complex to be performed by a human operator or pilot with the speed and accuracy required, and automatic means is to be preferred.

The prior art of aircraft propulsion control has employed limited means for control of inlet duct and for control of one or the other of a turbojet and turbofan aircraft engine. However, such separate control means for each of such types of engines and inlet yet does not provide adequate matching between such separate types of propulsion where combined in an integrated propulsion system, whereby the skill limits of a human operator or pilot may yet be exceeded. Further, such separate control systems represent an unnecessary degree of equipment complexity, redundancy and cost, in view of the limited effectiveness achieved. In other words, the prior art has not provided automatic and efficient means for optimum control of an integrated aircraft propulsion system.

SUMMARY OF THE INVENTION

By means of the concept of the subject invention, the above noted shortcomings of the prior art are avoided and an integrated control system is provided for automatic control of a multi-mode aircraft propulsion system having a variable geometry inlet duct, a turbofan primary gas generator and at least one turbojet auxiliary gas generator.

In a preferred embodiment of the invention, there is provided manually operable signalling means for generating a command signal indicative of a selected thrust condition of the multimode aircraft propulsion system. There is also provided a plurality of preselectively thresholded closed loop controllers responsive to preselected levels of the command signal for operation and control of the primary and auxiliary gas generators, alternatively and concomitantly.

In normal operation of the above described arrangement, for example, the low pressure fan of the main engine is selectively utilized to provide (1) supercharged air to the main gas generator and (2) bypass air, alternatively used as fan bypass for the main gas generator and as an air supply for an auxiliary gas generator. Also, speed control of each of the main gas generator and auxiliary gas generator is integrated with control of the variable air inlet ducts and engine nozzle exhaust areas. Thus, the control system utilizes a plurality of control parameter schedules, scheduled from a single command power demand input, to effect a wide range of thrust control under both subsonic and supersonic flight conditions. In other words, operation of the inlet, fan, main engine, auxiliary engines and nozzles of the propulsion system is integrated by the control system to accommodate the air handling characteristics of the variable inlet duct for optimum propulsion system performance.

It is therefore a principal object of the present invention to provide an automatic control system for an integrated multimode aircraft propulsion system.

It is another object of the invention to provide an integrated control system operable by means of a single command power demand signal for efficient control of a turbofan engine and a turbojet engine, alternatively and concomitantly, to effect a wide range of thrust conditions under a wide range of flight conditions.

It is still another object to provide means for selectively controlling a plurality of aircraft propulsion units in an optimum one of a number of operating modes depending on the flight condition.

Yet a further object is to provide means for selectively operating a plurality of aircraft propulsion units in a selected mode of operation by a single common command control signalling device.

These and further objects of the invention will become apparent from the following description, taken together with the accompanying drawings in which:

BRIEF DESCRIPTION OF THE DRAWINGS

In the figures, like reference characters refer to like parts.

DESCRIPTION OF THE PREFERRED EMBODIMENT

Figure 1:
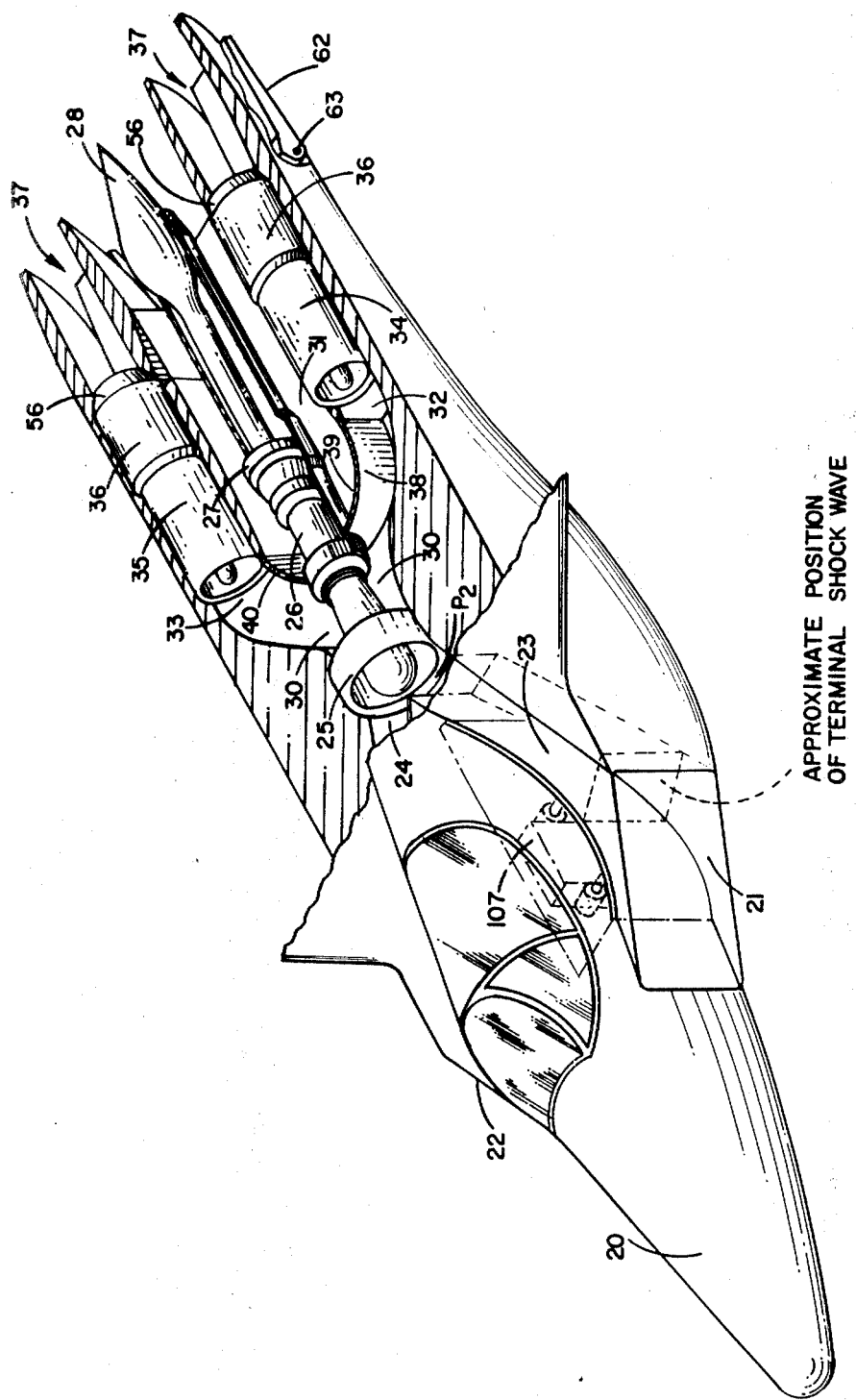
FIG. 1 is a partially-sectioned perspective view of an examplary propulsion system arrangement in an aircraft in which the concept of the invention may be advantageously employed.

Referring now to FIG. 1, there is illustrated a partially-sectioned perspective view of an exemplary multi-mode propulsion system arrangement installed in an aircraft, and with which the concept of the invention may be advantageously employed. The propulsion system is schematically represented in an aircraft fuselage 20, with the wing members cut away for clarity of description, and is shown having a pair of air inlet ducts 21 and 22 located on opposite sides of the fuselage 20 for directing air through channels 23 and 24, respectively, to the inlet of a low pressure fan or compressor 25. Low pressure fan 25 is mechanically coupled through a centrally disposed high pressure gas generator 26 to power turbine 27, the exhaust of power turbine 27 being directed rearwardly through the variable primary exhaust nozzle indicated generally at 28. Low pressure compressor 25, gas generator 26, power turbine 27 and exhaust nozzle 28 constitute a primary turbofan engine 29.

Figure 2:
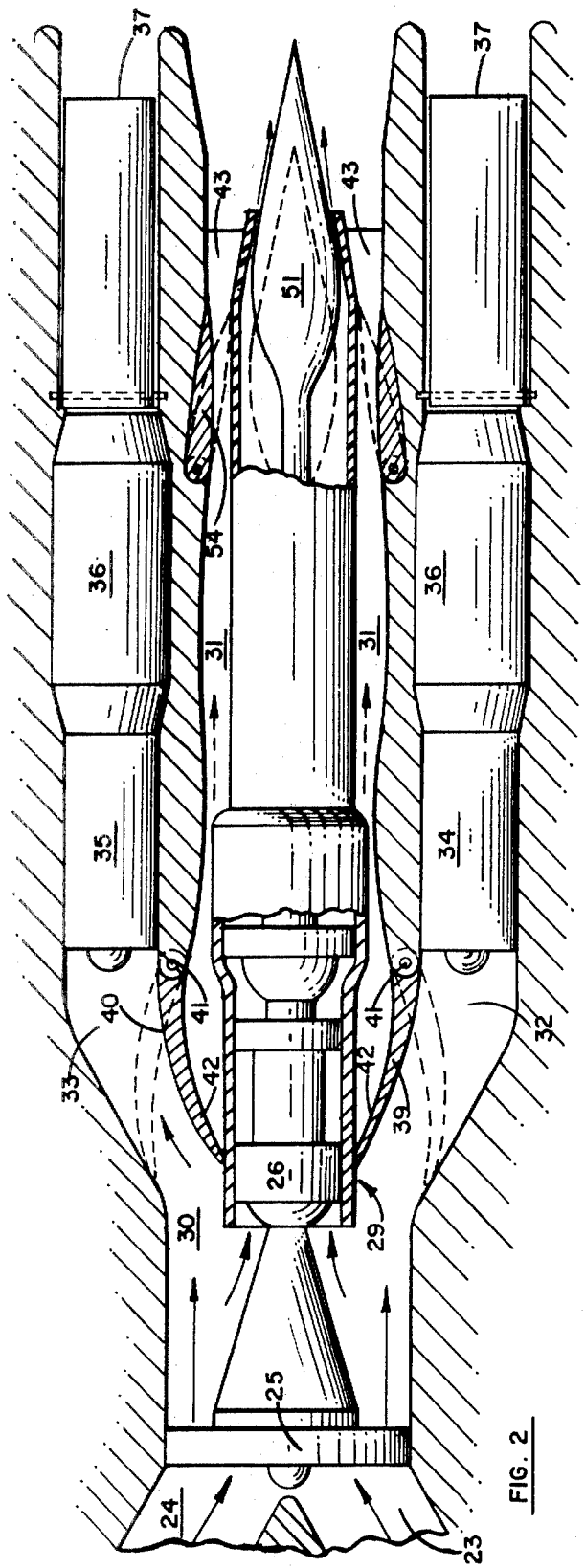
FIG. 2 is a partially sectioned plan view of the propulsion arrangement in FIG. 1.

Supercharged air from compressor 25 is discharged into a fan air collector duct 30 connected to: the inlet of gas generator 26, a bypass channel 31 for the primary engine 29, and through auxiliary engine inlet ducts 32 and 33 to a pair of auxiliary gas generators 34 and 35 (shown more particularly in FIG. 2). Auxiliary gas generators 34 and 35 are preferably arranged in pairs on opposite sides of the primary engine 29, each auxiliary gas generator having an afterburner 36 and a separate, variable area, exhaust nozzle, indicated generally at 37.

Located between the fan air collector duct 30 and the auxiliary ducts 32 and 33 is a gas diverting valve means 38 which includes synchronously movable baffle plates 39 and 40, rotatably mounted on separate shafts 41 (shown more clearly in the partial section and torn away plan view of FIG. 2). Elements 39 and 40 comprise valving means for directing the flow of pressurized air from duct 30 through either bypass 31 or gas generators 34 and 35.

Under ordinary subsonic flight conditions, the baffles 39 and 40 are positioned (in the dotted line position shown in FIG. 2) to direct that portion of the discharge from compressor 25 which does not flow into the inlet of high pressure gas generator 26, into the bypass duct 31 around the primary engine 29. Where supersonic aircraft performance is required, operation of gas generators 34 and 35 is initiated and baffles 39 and 40 are actuated to a second position (as shown by the solid line position in FIG. 2) to direct pressurized air into ducts 32 and 33, while closing bypass channel 31.

When the system is operating in the fan mode, the air in the fan bypass 31 is directed around the main gas generator 26 and out the annular bypass nozzle 34, providing a low pressure drop through the bypass duct 31. Ordinarily the side gas generator nozzles 37 are closed during operation of the main fan engine 29 in the fan mode.

FIGS. 1 and 2 also show the adjustable exhaust nozzle 28 of the main gas generator 29 and the variable area nozzle 43 of the fan air bypass duct 31. Various positions for the variable area exhaust nozzles are illustrated in FIG. 2. Specifically, the primary gas generator exhaust nozzle 28 is shown having a variable plug 51 shown in solid line in an extended position and having a collapsed position (shown in dotted line), for which appropriate configuration-changing means may be provided, as is well-known in the art. Bypass duct 31 is provided with a variable area iris type closure or nozzle 54 within the outlet 43. The open position for the bypass nozzle 54 is shown in solid lines, while the closed position is shown in dotted lines. The nozzle area of bypass nozzle 54 may be varied as required by appropriate drive means.

Figure 3:
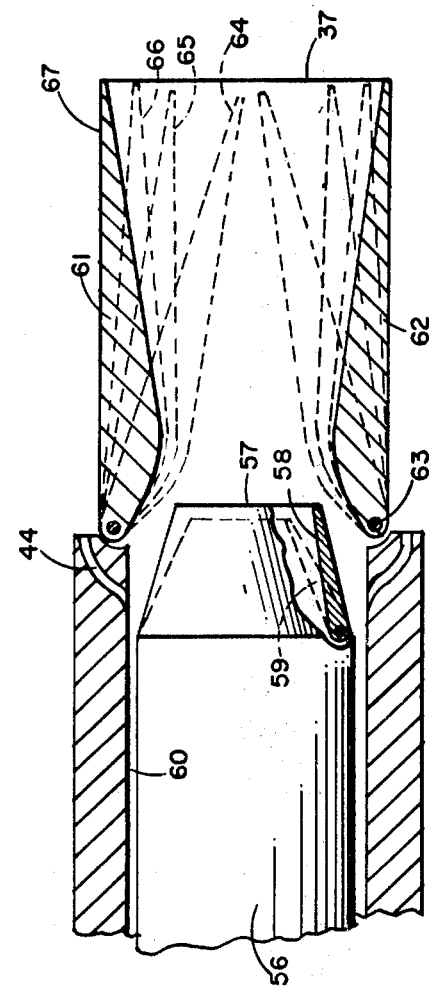
FIG. 3 is an illustration in further detail of the exhaust nozzle arrangement for the auxiliary gas generators of FIG. 1.

FIG. 3 shows the nozzle arrangement for each of the auxiliary gas generators 34 and 35. The tailpipes 56 of the auxiliary gas generators 34 and 35 each have a variable throat area 57 as indicated in FIG. 3 by nozzle positions 58 and 59. An annular cooling airflow at 60 is mixed with the tailpipe exhaust and emitted through the variable area exhaust nozzle 37. Nozzle 37 consists of a pair of oppositely disposed flaps 61 and 62 synchronously rotatable about shafts 63 by appropriate means not shown. The four exemplary states of nozzle flaps 61 and 62, indicated at 64, 65, 66 and 67, respectively, represent the closed position, subsonic position, transonic flight position (1.2 M) and supersonic flight position (2.5 M) (with afterburner), respectively.

A further description of the above-described multi-mode aircraft propulsion system may be found in the above-noted copending U.S. application Ser. No. 592,086 filed Nov. 4, 1966.

Each of the two types of propulsion combined in such propulsion system has several alternative operating modes. For example, the turbofan engine propulsion mode, itself, has an idle speed mode and a military or maximum rated speed mode, which two conditions correspond to two extremes of incremental thrust. Intermediate thrust conditions are provided by appropriate and concomitant adjustment of the fan engine low pressure (compressor) rotor speed $N_1$ (by adjustment of the fan engine exhaust nozzle area $A_J$), the fan airflow (by adjustment of the fan duct exit area $A_D$), and the fan engine high pressure rotor speed $N_2$ (by adjustment of the fan engine fuel flow $W_f$).

The turbojet propulsion mode includes an idle speed mode and "dry" military mode (without afterburner) corresponding to the like turbofan operating modes. Thrust conditions intermediae the turbojet idle and dry military speed thrust conditions are effected by adjustment of turbojet engine speed $N_{2x}$ (by adjustment of the turbojet fuel flow, $W_{fx}$) and turbine inlet temperature (by adjustment of the turbojet engine exhaust nozzle area, $A_{8x}$). In addition, the turbojet military speed mode further includes the capability of modulating afterburner fuel flow between a minimum afterburner and maximum afterburner mode, corresponding to successive levels of thrust.

Figure 5:
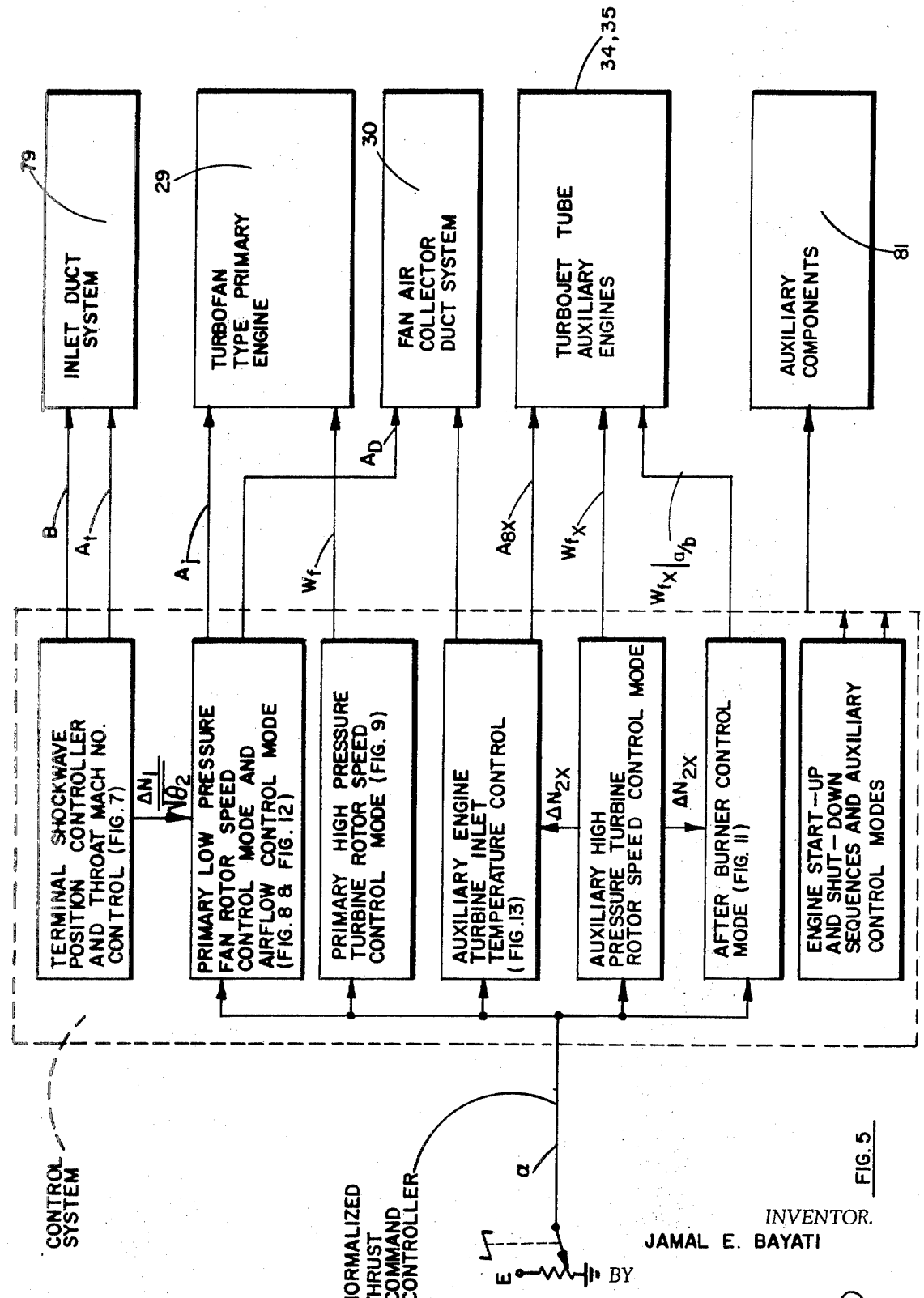
FIG. 5 is a schematic diagram of the general control system of the present invention, intended for cooperation with the propulsion system of FIG. 1 or of FIG. 4.
Figure 6:
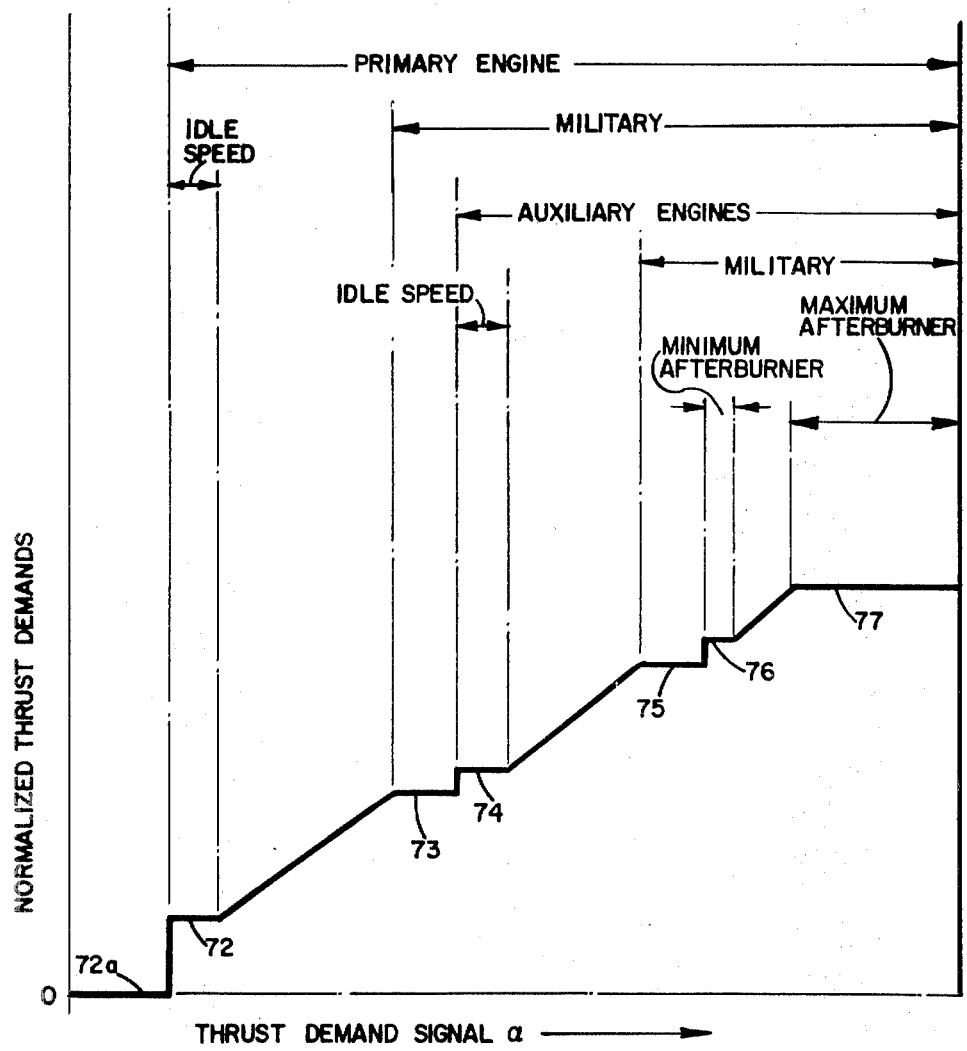
FIG. 6 is a graph of the operating modes of the system of FIG. 5 as a function of the common signal output of the single common command signalling means of FIG. 5.

Control of the primary (turbofan) and auxiliary (turbojet) modes is organized by means of the control system of the invention to provide efficient means preferably responsive to a single command controller for providing a wide range of thrust conditions over both subsonic and supersonic flight conditions, as shown more particularly in FIGS. 5 and 6.

Referring to FIG. 6, there is plotted a curve of normalized open loop thrust command as a function of the command signal output $\alpha$ of the single common, manually-operable command signalling means or control lever employed by the control system of FIG. 5, and illustrating a preselected sequence of propulsion system operating modes by which such function is implemented.

For any flight condition, the commanded thrust increases with an increase in the command signal input $\alpha$ to the control system. Plateaus or flat spots are indicated in the system response, indicating limits of the several operating modes, and are provided in order to avoid undesired system switching or oscillation between modes. For example, the region 72a represents a shut-down region, region 72 represents that thrust level associated with primary engine idle speed, region 73 corresponds to primary engine military speed, while the region intermediate plateaus 72 and 73 corresponds to intermediate thrust conditions associated with fan engine speed conditions intermediate the idle and military speeds of the primary engine. Plateau 74 represents the thrust condition produced by operation of the auxiliary engines at idle speed in conjunction with operation of the primary engine at military speed, plateau 75 corresponds to operation of both the primary and auxiliary engines at military (with afterburner off) while the region intermediate plateaus 74 and 75 represents intermediate thrust conditions associated with the auxiliary engine dry operation (and primary engine military speed).

Although the mode controllers of the control system of FIG. 5 for controlling the integrated propulsion system critical parameters are represented as open loop controllers, it is understood that such organization contemplates closed loop modes of control, as will appear more particularly hereinafter. Optimum operation of the propulsion system also includes control of the inlet duct (elements 21, 22, 23 and 24 of FIG. 1). Further, the control system includes necessary start-up and shut-down sequences. Moreover, override provisions are included for off-nominal system operation so that all possible engine operating combinations are obtainable.

In addition to the control system utilization of the various actuators associated with the multimode propulsion system, sensors are installed in the propulsion system for providing necessary feedback to closed loop control modes, for necessary gain-control compensation or for compensatory biasing of controller operating points. Such provisions for instrumentation sensors and actuation for parameter control are set forth in the above mentioned copending U.S. application Ser. No. 592,086 filed Nov. 4, 1966.

Figure 4:
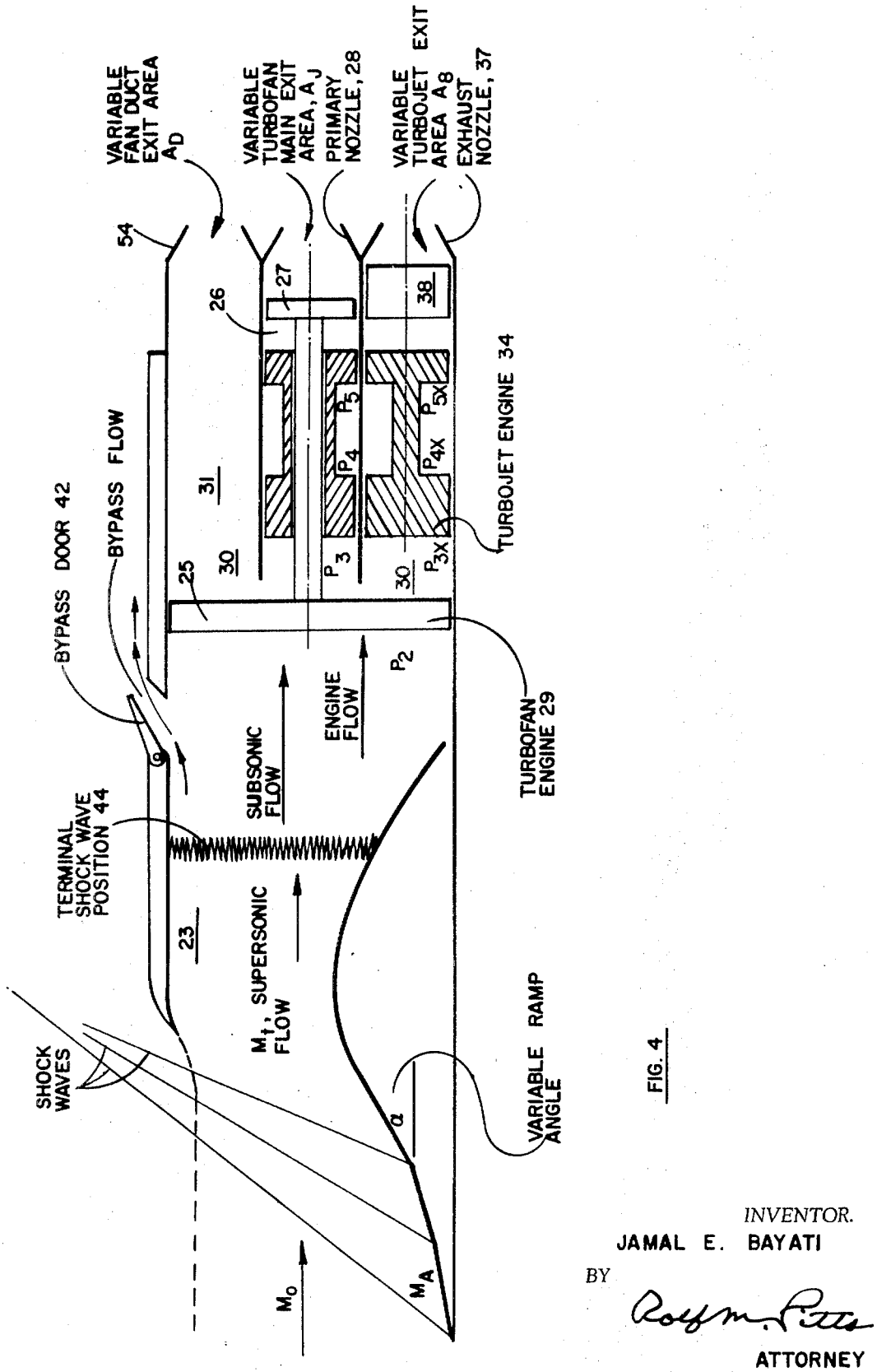
FIG. 4 is a simplified schematic arrangement of a vertical section of an alternate multimode propulsion system and showing the situation of a controllable terminal shock wave in an inlet duct thereof.

Means for controlling the inlet variable ramp angle and the inlet throat Mach number may be provided in order to maintain the inlet air flow within preselected limits, as is understood in the art, wherefore the Mach number sensor means thus employed is available for use otherwise in the integrated propulsion control system of the invention. FIG. 4 illustrates a schematic arrangement of an alternate engine arrangement, employing only a single auxiliary engine, and shows inlet means having a variable ramp angle and variable throat area for controlling the inlet oblique shock pattern and the throat Mach number, respectively. In order to better assure optimum pressure recovery at the inlet duct during high supersonic flight Mach numbers, it is preferred that the position of the terminal shock wave 44 (in FIG. 4) in the inlet duct 23 be controlled. In the prior art, such shock position control has been effected by operation of an auxiliary (overboard) bypass door located between the inlet duct throat area and the engine face in response to pressure sensor data indicative of the shock wave position. Such sensor arrangement may include a plurality of static pressure sensors arrayed longitudinally (fore and aft) within the inlet duct, the terminal shock wave position being indicated as being between two adjacent sensors between which a preselected differential pressure is indicated. An alternate method is by computing the shock position from pressure ratio measurement within the duct.

The control of the shock position by operation of an auxiliary (overboard) bypass door degrades the air inlet performance due to (1) the irreversible expansion (and loss) of the high energy air through the overboard door and (2) the resultant change in the inlet air velocity vector (relative to the engine exhaust velocity vector). By means of one aspect of the invention, the engine air flow is modulated to control the inlet duct terminal shock wave position, except during rapid transients and maximum engine air flow limitation (under which latter conditions an auxiliary bypass door may be used), as shown more particularly in FIG. 7. This auxiliary bypass door may also be used for shock position control during the presence of flow transient.

Figure 7:
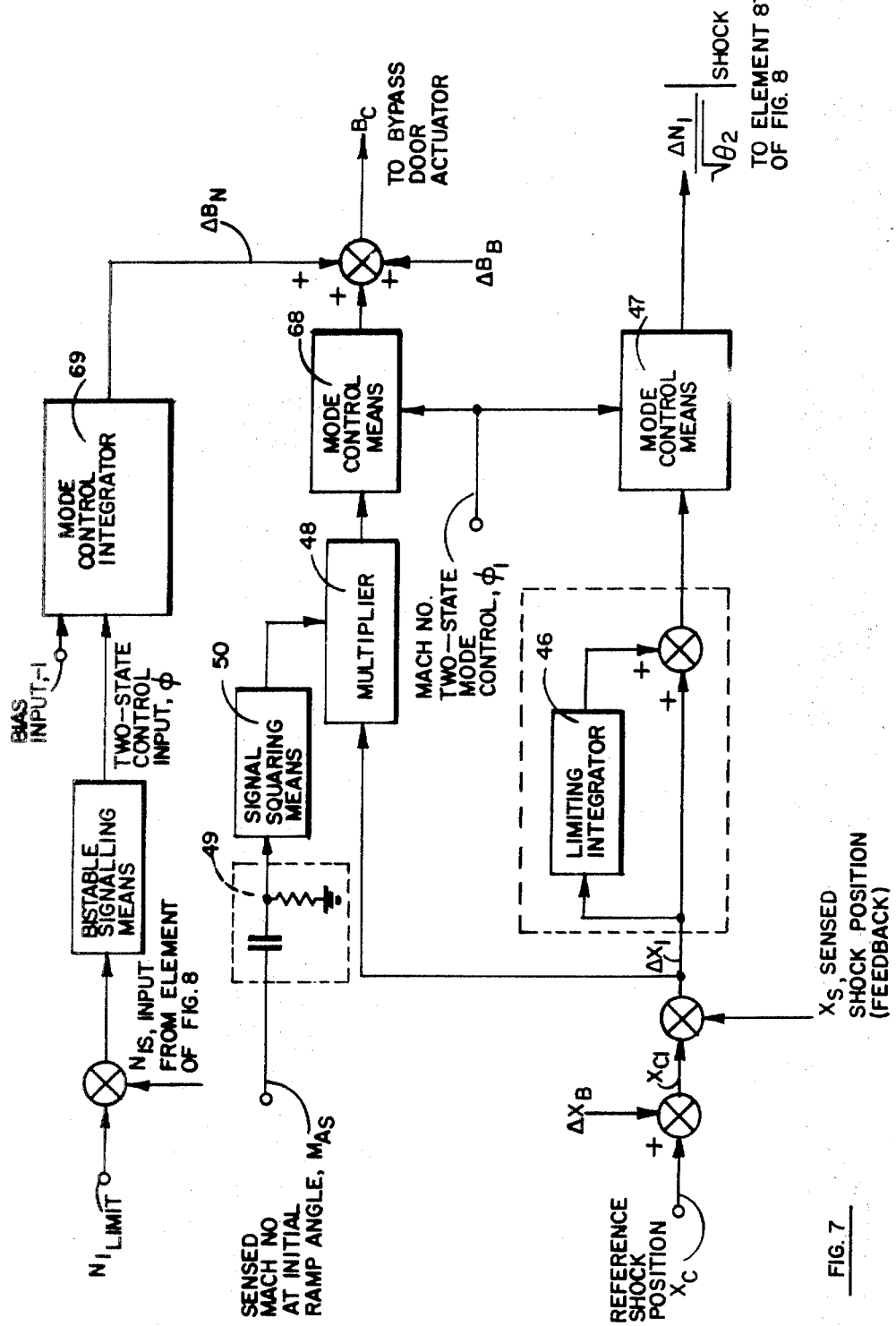
FIG. 7 is a block diagram of a terminal shock wave controller element, included in the control arrangement of FIG. 5.
Figure 8:
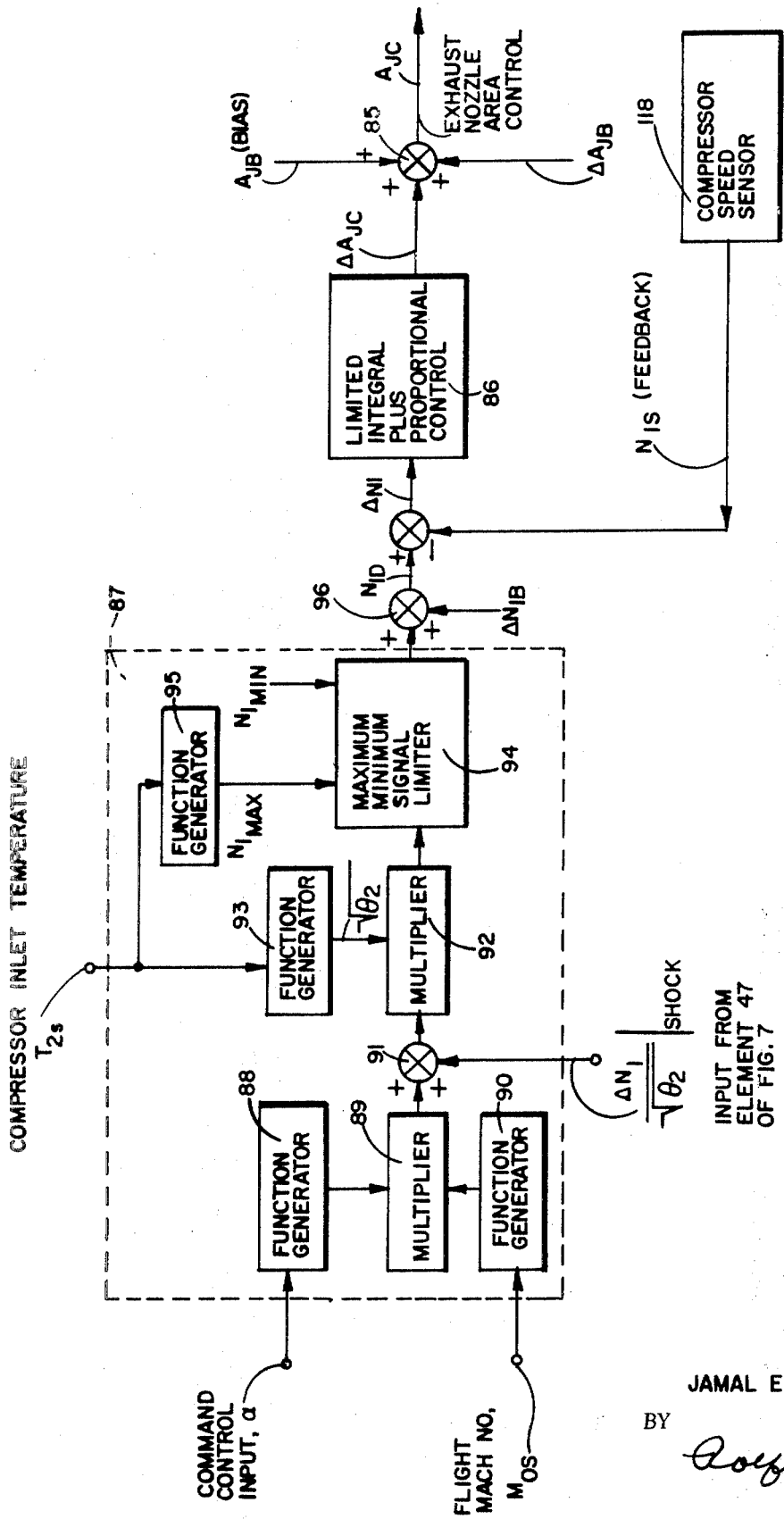
FIG. 8 is a block diagram of the primary low pressure fan rotor speed control mode of FIG. 5.

Referring to FIG. 7, there is illustrated in block diagram form, an exemplary arrangement of terminal shock wave controlling means, employing a signal indicative of the difference between a sensed shock wave position $X_s$ and a reference shock wave position $X_c$ and applied through a limited integral plus proportional control signalling means to provide a fan rotor reset speed command bias $$\left.\frac{\Delta N_1}{\sqrt{\theta_2}}\right|_{SHOCK}$$

in FIG. 5 (and shown more particularly in FIG. 8). Such change in the speed of the fan rotor or compressor (of FIG. 1 or FIG. 4) thus effects a change in the pressure downstream of the inlet throat as to compensatorily adjust the position 44 of the terminal shock wave (in FIG. 4).

Integral plus proportional control is employed to assure a "trim" signal for zero steady-state shock position control error by means of integrator 46, while retaining the inherent rapid dynamic response of proportional control. Limiting of the integrator output is desired in order to reduce the extent and duration of adverse system overshoots required to reverse the polarity of the integrator charge, should a control bias or "trim" signal reduction become required. In other words, the limited integral plus proportional means for generating a fan rotor speed reset signal $$\left.\frac{N_1}{\sqrt{\theta_2}}\right|_{SHOCK}$$

in response to variations in shock position, assures that the fan rotor control loop gain and system thresholds will not compromise the response of the shock position control function. A further description of integral plus reset control may be found at column 5 of U.S. Pat. 3,175,526 issued to J. M. Johnson et al., for Automatic Altitude Control System for a Hydrofoil Vessel and also in FIG. 4 of U.S. Pat. 3,175,786 issued to A. A. Frank et al. for Helicopter Flight Control System.

The terminal shock position control function is normally not required at low vehicle speeds (below 1.8 Mach number) and, therefore, mode control means 47 may be interposed at the output of the limited integral plus proportional control means to prevent the unnecessary occurrence of a fan rotor speed reset signal $$\left.\frac{N_1}{\sqrt{\theta_2}}\right|_{SHOCK}$$

at such lesser Mach numbers. Such two-state control ($\phi_1$) is thus provided as a function of vehicle speed.

The shock position control signal, $\Delta X$, may also be used to generate a control $\Delta B_c$ for controlling the opening $B_c$ of the bypass door 42 (of FIG. 4) as a further means of controlling shock position. The control gain of this loop is varied as a function of the square of the rate of the inlet ramp Mach number, $\dot{M}_{AS}$, by means of a multiplier 48. Mach number rate, $\dot{M}_{AS}$, may be provided by a wash-circuit 49 having a transfer function of the form $$\frac{\tau s}{(\tau s + 1)}$$

while a function generator, non-linear diode detector or other non-linear signalling means 50 may be employed to provide a gain control signal indicative of the square of the rate of change of Mach number, $\dot{M}_{AS}$. Because of the rate-signal-squaring gain control function, the $\Delta B_c$ signal contribution to the bypass door control is substantially nil for low rates of change of Mach number (i.e., low air flow transients and non-maneuvering vehicle conditions). Mode control means 68 as a function of the two-state vehicle speed signal, $\phi_1$, may be similarly employed with the $\Delta B_c$ control loop, as with the $$\left. \frac{N_1}{\theta_2} \right|_{SHOCK}$$

fan rotor speed reset loop.

The $B_c$ signalling means of FIG. 7 for controlling the inlet duct auxiliary bypass door 42 (of FIGS. 1 and 4) may be further responsive to overspeed conditions of the fan rotor (compressor) 25 of FIGS. 1 and 4. A fan rotor speed $N_1$ in excess of a maximum limit $N_{1_{LIM}}$ is associated with an upstream position of the terminal shock. By opening the bypass door 42 (in FIG. 4) by an amount $\Delta B_N$, the terminal shock is caused to move aft or down stream. In other words, the operation $\Delta B_N$ of the bypass door in response to a fan rotor overspeed condition, biases the terminal shock position so that the operation of the shock position control loop, for reset control $$\left. \frac{\Delta N_1}{\sqrt{\theta_2}} \right|_{SHOCK}$$

of the fan rotor speed control, may continue to effectively maintain the terminal shock wave in a fixed position. Suitable hysteresis is preferably included in the design of the $\Delta B_N$ signalling means in order to avoid unnecessary recycling of the bypass door. Such signalling means preferably further includes a mode control integrator 69 in which the sense of the hysteretic-processed output signal indicative of the difference ($N_{1s}-N_{1_{LIM}}$) between the sensed fan rotor speed $N_{1s}$ and the limit speed $N_{1_{LIM}}$ is used as a two-state logic signal $\phi$ to insert a preselected initial condition in integrator 69 which acts as a step input or increment to the bypass door actuator signal, $B_c$, thereby changing the terminal shock position. This initial condition remains as long as the state of $\phi$ does not vary. When the fan motor speed reset control signal $$\left. \frac{\Delta N_1}{\sqrt{\theta_2}} \right|_{SHOCK}$$

has sufficiently reduced the fan rotor speed $N_{1s}$ (shown more particularly in FIG. 8) in response to the terminal shock position control loop response, $X_s$, such that the sense of ($N_{1s}-N_{1_{LIM}}$) reverses, then the sense of the mode control signal $\phi$ reverses, freeing the integrator and resetting the integrator 69 input level to a negative unity, resulting in a ramp decay of the integrator output in a sense tending to reduce $\Delta B_N$ and close the bypass door.

The control of an integrator for the insertion of an initial condition and a reset condition is known in the art, being illustrated, for example, for an analog integrator in FIGS. 7.2 and 7.3(a) in Chapter 7 of the text, Electronic Analog Computers by Korn and Korn, second edition, published by McGraw-Hill (1956).

Under transonic and supersonic flight conditions in which the inlet duct (element 23 of FIG. 4) is operated in the "unstarted" (subsonic flow throughout the inlet duct) condition ($\phi=0$, in FIG. 6), matching of the inlet duct air flow and engine air flow is also necessary. Such matching function may be effected as an open-loop control of fan rotor (compressor) speed as a function of flight Mach number, as shown more particularly in FIG. 8.

Referring to FIG. 8, there is illustrated in block diagram form speed control means for the low pressure rotor or compressor 25 of FIG. 1 and corresponding to a like mode of the system of FIG. 5. The fan rotor speed $N_1$ of compressor 25 of FIGS. 1 and 4 is controlled by actuation of the primary exhaust nozzles 28 (in FIG. 1) in response to a nozzle area control signal, $A_j$, generated in FIG. 8. Such signal is shown in FIG. 8 as including a bias component $A_{jB}$ injected at signal summing means 85, although such bias or operating point may be inserted mechanically by biasing or adjustment of a mechanical linkage. A second signal component, $\Delta A_{jc}$, is generated as a function of the response of limited integral and proportional control means 86 to the difference ($\Delta N_1=N_{1D}-N_{1s}$) between a compressor rotor speed demand signal $N_{1D}$ and a compressor rotor speed feed back signal, $N_{1s}$.

Such demand signal $N_{1D}$ is generated as a compensated function of the command control input $\alpha$, by dotted block element 87, and includes maximum/minimum limiting of the speed control demand and compensation for compressor inlet temperature $T_{2s}$, flight Mach number $M_{os}$ and terminal shock position, $$\left. \frac{\Delta N_1}{\sqrt{\theta_2}} \right|_{SHOCK}$$

An uncompensated speed demand signal is generated as a function of $\alpha$ by means of a first function generator 88, the output of which is gain-modulated as a function of a multiplier 89 input coupled to the output of a second function generator 90, which, in turn, is responsive to a signal $M_{os}$ indicative of flight Mach number. The output of gain-control means 89 is then biased by signal combining means 91 which has an input coupled to the output $$\left. \frac{\Delta N_1}{\sqrt{\theta_2}} \right|_{SHOCK}$$

of element 47 of FIG. 7. Such bias of the fan rotor demand speed thus aids in regulating the terminal shock position in the inlet duct, as was explained in connection with the description of FIG. 7.

Further gain compensation of the speed demand signal as a function of compressor inlet temperature $T_{2s}$ may be provided in FIG. 8 by means of a second multiplier 92 responsively coupled to a third function generator 93 which in turn, is responsive to a signal indicative of temperature $T_{2s}$. The purpose of such further gain control is to convert the compressor corrected speed demand (essentially a compressor rotor tip Mach number) to mechanical speed demand by multiplying it by $\sqrt{\theta_2}$, which varies as a function of the ratio of the Rankine temperature $T_{2s}$ to a standard atmosphere temperature. In other words, the gain control output of function generator 93 varies as the square root of the normalized Rankine temperature of the compressor inlet which reflects the acoustic velocity at $T_2$.

Finally, maximum and minimum limiting of the speed demand signal is provided by limiting means 94, the maximum limit signal $N_{1_{MAX}}$ being determined, if desired, as a function of the temperature $T_{2s}$.

The construction and arrangement of function generators, multipliers and limiters are well understood in the computing equipment art, and therefore elements 88, 89, 90, 92, 93, 94 and 95 are shown in block form only for convenience in exposition. Analog forms of such functional elements are taught, for example, in Chapter 6 of the above-mentioned text "Electronic Analog Computers," for which digital equivalents are also well understood to those skilled in the digital computer art.

Transient accommodations or compensation for rapid changes of flight conditions or vehicle maneuvering may be provided, if desired, by compensatory biasing ($\Delta N_{1B}$) of the speed demand signal at summing means 96 and by compensatory biasing ($\Delta A_{JB}$) of exhaust nozzle control signal summing means 85.

A preferred level of performance of compressor 25 (of FIG. 1) under all flight conditions may require control of the airflow through the fan or low pressure compressor. An advantageous and convenient technique for effecting such control mode is by closed loop control of the fan air flow corrected to the fan discharge condition because of the sensitivity of this parameter to variation in the fan duct exhaust nozzle area, $A_D$. Another advantage of such technique is that for the integrated propulsion systems illustrated in FIGS. 1 and 4, the auxiliary engine inlet condition is similar to the fan discharge condition; this allows conveniently treating the auxiliary engine as a variable nozzle which increases the effective fan duct exhaust nozzle area by an amount proportional to the auxiliary engine corrected air flow (as illustrated by the $A_{se}$ signal injection at element 128 of FIG. 12).

Figure 12:
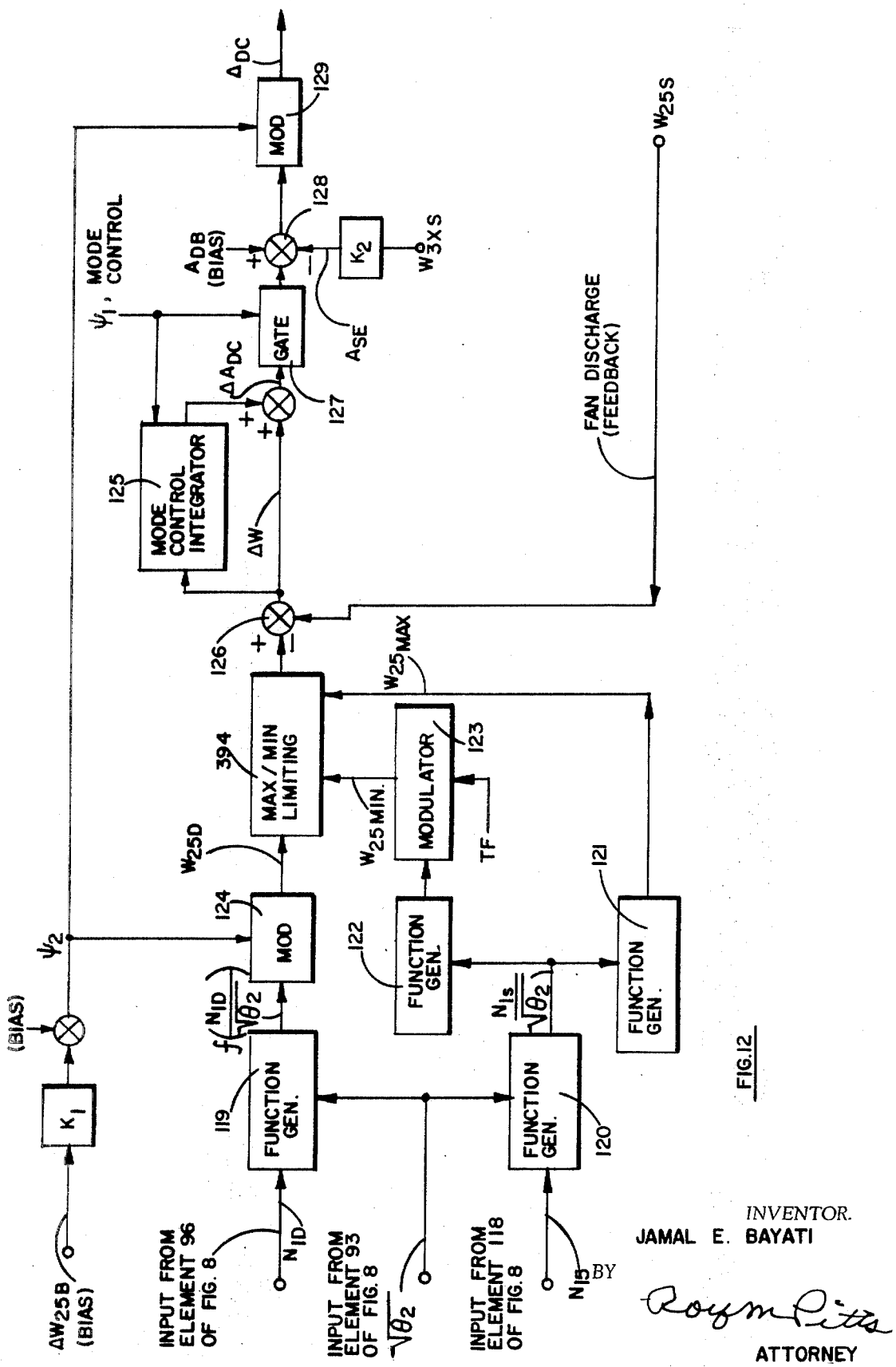
FIG. 12 is a block diagram of an exemplary closed loop fan air flow control mode, included in the control arrangement of FIG. 5.

In a preferred scheme for control of the fan discharge airflow (as shown in FIG. 12), the fan speed demand (low pressure rotor speed demand) $N_{1D}$ of FIG. 8 is employed to establish the desired airflow through the engine system, and provides rapid airflow response as to be compatible with the inclusion of the terminal shock control mode of FIG. 7.

The fan speed demand $N_{1D}$ is applied to a function generator 119 responsive to the normalized Rankine temperature $\sqrt{\theta_2}$ for generating a function of $$\left(\frac{N_{1D}}{\sqrt{\theta_2}}\right)$$

corresponding to the demand of the corrected air flow of the fan. The fan corrected airflow demand $W_{25D}$ is subjected to maximum/minimum limiting by limiting means 394. Maximum limiting of the discharge flow demand is required to avoid unloading the fan, while minimum limiting is required in order to prevent inducing a stall or fan overload condition. The maximum limit $W_{25MAX}$, is determined as a function of the ratio of the actual fan speed $N_{1s}$ to the normalized Rankine temperature $\sqrt{\theta_2}$, as provided by ratio means 120 and function generator 121. Such ratio means may include a gain control stage, multiplier means in closed loop arrangement or other computing elements known per se.

The lower limit $W_{25MIN}$ is similarly computed as a function of the ratio of the actual fan speed $N_{1s}$ to the normalized Rankine temperature $\sqrt{\theta_2}$, by means of a function generator 122 responsively coupled to the output of element 120. Transient accommodation means may be included in the minimum limit by means of a modulator 123 responsive to a signal TF indicative of a flow transient condition, to provide additional stall margin in the presence of a contemplated transient.

Transient accommodation means may also be included in the computation of the fan discharge airflow demand by a modulator 124 interposed between elements 119 and 394 and responsive to a flow transient accommodation gain control input, $\psi_2$.

The demand signal $W_{25D}$ is employed in closed loop control of the fan airflow discharge condition by limited integral plus proportional control means, including a mode control integrator 125. Differential signal combining means 126 responsive to the demand signal $W_{25D}$ and to sensed fan discharge air flow $W_{25s}$, provides a signal $\Delta W$ indicative of the difference therebetween, and which is employed as to generate a control signal $\Delta A_{DC}$ for control of the nozzle area ($A_D$) of the fan duct exhaust nozzle (in the fan duct 31 of FIG. 4). Such control signal may be subjected to mode control switching by a gate 127 responsive to a mode control signal $\psi_1$, which two-state signal is also employed to provide a null initial condition at the output of the integrator 125 in order to avoid inducing large system transients upon switching-on the closed loop control mode, $\Delta A_{DC}$. Such gated control signal $\Delta A_{DC}$ is combined with a nominal state or bias signal $A_{DB}$ at signal combining means 128. Such bias signal $A_{DB}$ may be compensated by the addition of a compensatory bias $A_{SE}$ as a function of the auxiliary engine corrected inlet airflow $W_{3Xs}$, while the gain or signal level of the output of summing means 128 may be further modulated or increased by a modulator 129 in response to transient accommodation signal $\psi_2$, in providing the total fan discharge duct exhaust nozzle area signal, $A_{DC}$.

The fixed bias $A_{DB}$ corresponds to the required fan duct exhaust nozzle area for subsonic flight conditions and with the auxiliary engine shutdown, in which situation the propulsion system is operated in a simple turbofan configuration (i.e., when $\psi_1=0$). The purpose of the compensatory bias, $-A_{SE}$, is to provide a reduction in the required fan duct exhaust nozzle area $A_{DC}$ by an amount corresponding to the equivalent nozzle area effect of the corrected inlet airflow of the auxiliary engine. A certain amount of hysteresis is preferably included in the mechanization of the $-A_{SE}$ signalling means to prevent system jockeying in response to small changes in the auxiliary engine inlet airflow.

The auxiliary controller of FIG. 12 allows a rapid mode change from a minimum propulsion thrust condition (such as in an aircraft landing situation) to a maximum thrust condition (as required by a "wave-off" by an air traffic controller) without loss of the shock wave position of the terminal shock wave (in FIG. 4).

Figure 9:
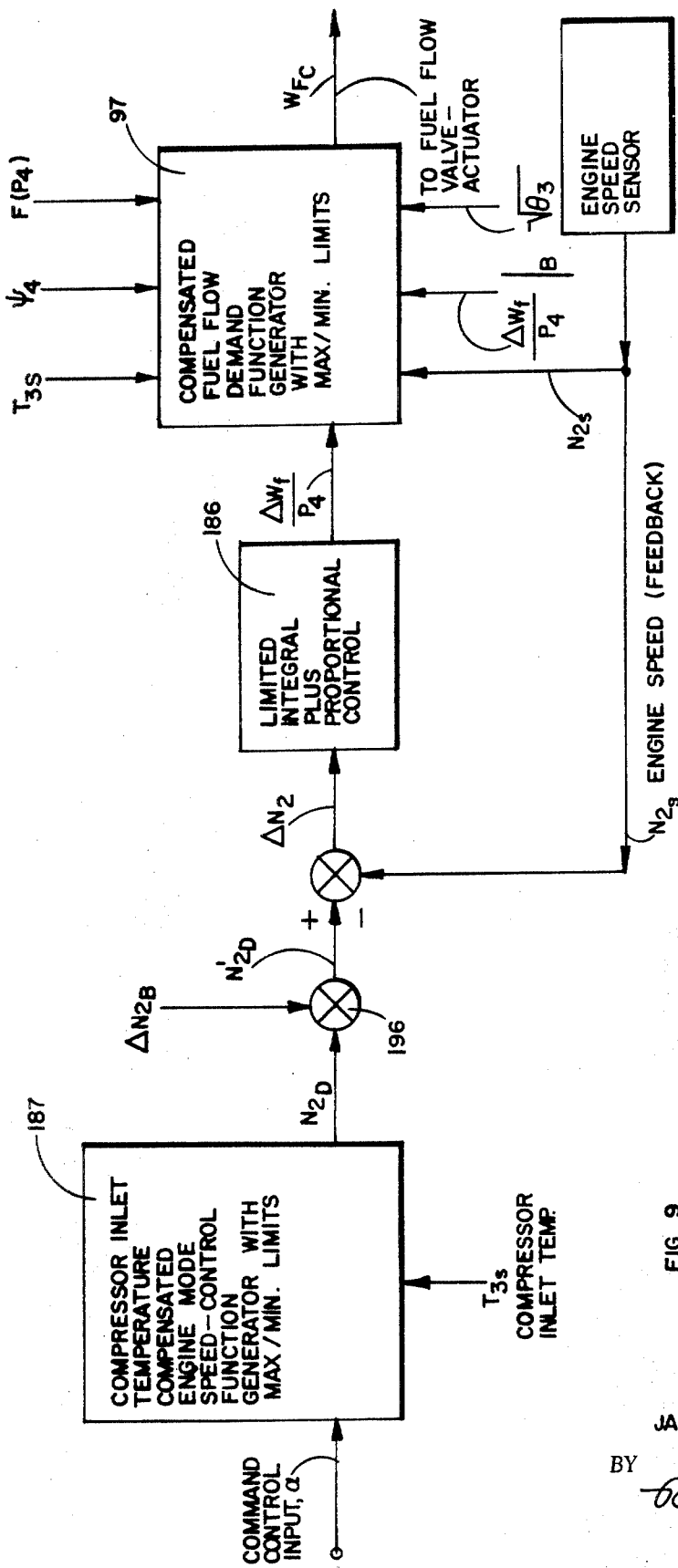
FIG. 9 is a block diagram of the primary high pressure rotor speed control mode of FIG. 5.

In conjunction with the control of compressor 25 (of turbofan engine 29 of FIG. 1) by means of the arrangement of FIG. 8, concomitant control of turbine 27 (of turbofan 29) is provided by means of the arrangement shown in FIG. 9.

Referring to FIG. 9, there is illustrated in more particularity the high pressure rotor speed control block of FIG. 5, for effecting control of the rotor speed $N_{2s}$ by actuation of a fuel metering control actuator in response to a control signal $W_{fc}$. There is provided a closed-loop high pressure rotor speed controller including limited integral plus proportional control means 186 responsive to the difference ($YN_2=N_{2D}'-N_{2s}$) between a speed demand signal $N_{2D}'$ and a feedback signal indicative of the rotor speed $N_{2s}$. Such demand signal is generated as a compensated function of the command control input $\alpha$ by function generator means 187. Function generator means 187 is functionally similar to, although somewhat simpler than, the function generator of FIG. 8, and includes a function generator responsive to input $\alpha$ for implementing the turbofan normalized thrust modes shown in FIG. 6 as a function of $\alpha$, with gain compensation being provided as a function of the normalized Rankine temperature of the high pressure compressor inlet, $T_{3s}$. Further, maximum and minimum limiting are included in the speed demand signal $N_{2D}$ generated by function generator 187. Transient accommodation biasing $\Delta N_{2B}$ by means of element 196 may be included, similarly as was included in the arrangement of FIG. 8, in order to maintain an approximately constant thrust in the presence of a flow transient condition.

Interposed at the output of integral plus proportional control means 186 of FIG. 9 is means 97 for further compensation of the turbofan fuel flow control signal, $W_{fc}$, including maximum/minimum limiting thereof. Such fuel flow compensation is responsive to provide turbine inlet temperature limiting, compressor stall and combustor flame-out protection by limiting the control fuel flow per unit compressor discharge pressure ($W_f/P_4$) and the fuel flow ($W_f$).

Figure 10:
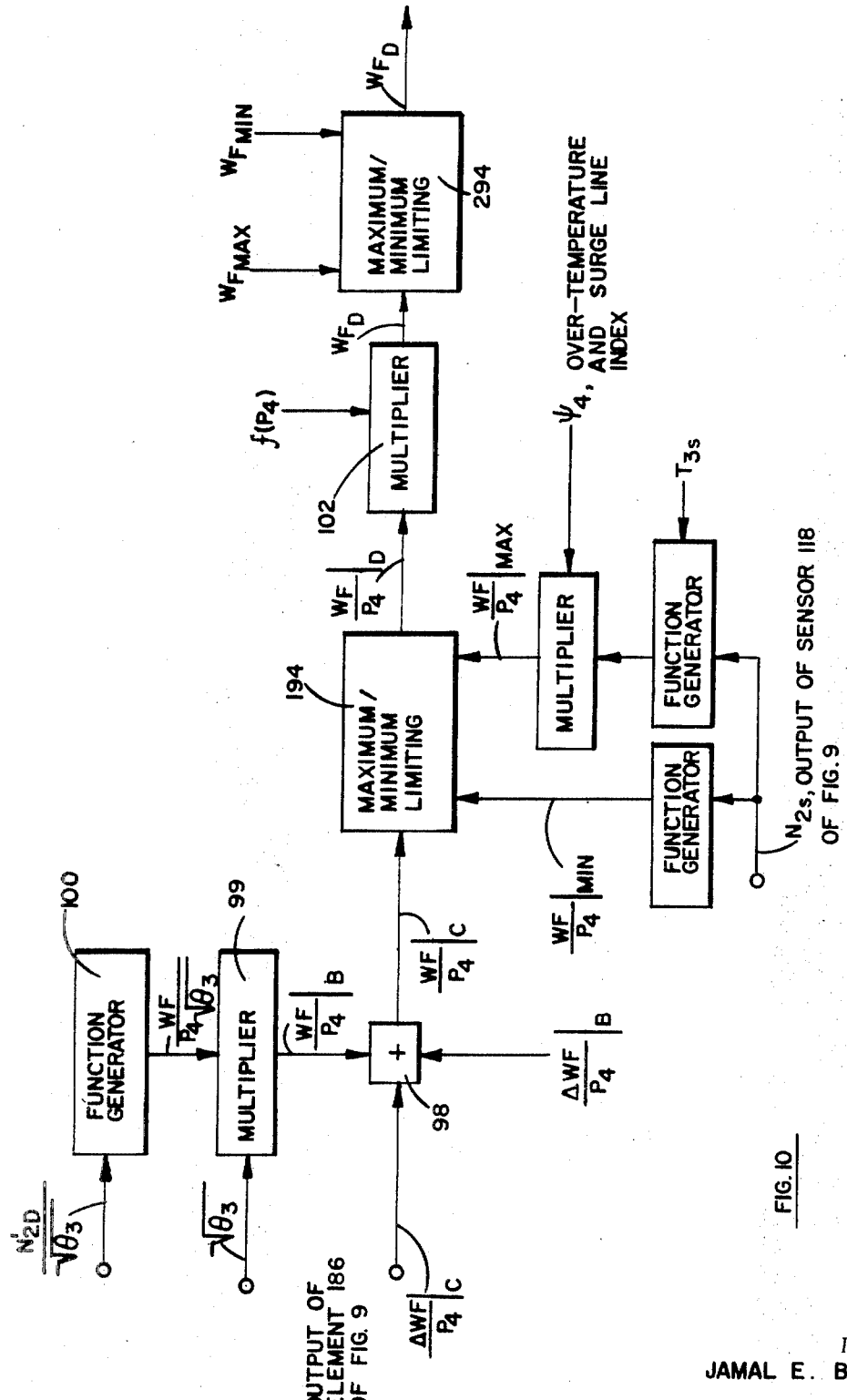
FIG. 10 is a block diagram in further detail of the compensated fuel flow demand function generator of FIG. 9.

The output of integral plus proportional control means 186 is utilized by element 97 as a source of a component signal $\Delta W_f/P_4|_C$, indicative of a desired change in fuel flow per unit compressor discharge, as shown more particularly in FIG. 10.

Referring to FIG. 10 there is shown in greater detail the arrangement of block element 97 of FIG. 9. There is provided summing means 98 having a first input responsive to a source 99 of a bias fuel flow per unit compressor discharge pressure bias or nominal operating the point, $$\left.\frac{W_f}{P_4}\right|_B$$

and further having a second input responsive to the output of element 186 (of FIG. 9) as a source of a desired change $$\left.\Delta\frac{W_f}{P_4}\right|_C$$

in such bias, due to the response of the high pressure rotor speed controller. Summing means 98 may also be adapted to be further responsive to a source of a flow transient accommodation signal, $$\left.\Delta\frac{W_f}{P_4}\right|_B$$

Bias source 99 may be a multiplier having a first input responsive to accoustic speed factor $\sqrt{\theta_3}$ and further having a second input responsive to a signal indicative of $$\frac{W_f}{P_4\sqrt{\theta_3}}$$

which latter function is generated by a function generator 100 in response to the corrected speed control demand function $$\frac{N_{2D}'}{\sqrt{\theta_3}}$$

Each of speed control functions $$\frac{N_D'}{\sqrt{\theta_3}}$$

and $\sqrt{\theta_3}$ are incidentally generated in function generator 187 (of FIG. 9) in the normalization of temperature $T_{3s}$ and in the gain-control or modulation of the speed demand signal.

The purpose of bias $$\left.\frac{W_f}{P^4}\right|_B$$

is to reduce the required control authority of the speed control loop integral control path (in element 186 of FIG. 9), so as to minimize any performance overshoot experienced in response to a large transient speed demand.

Maximum and minimum limiting of $$\left.\frac{W_f}{P_4}\right|_C$$

is effected by limiting means 194. The lower limit $$\left.\frac{W_f}{P_4}\right|_{MIN}$$

may be computed as a function of turbine speed $N_2$ by a function generator 101 to prevent flame out and fan stall; while the upper limit $$\left.\frac{W_f}{P_4}\right|_{MAX}$$

may be computed as a function of compressor inlet temperature $T_{3s}$ and turbine speed $N_{2s}$, and attenuated as a function of $\psi_4$, an over-temperature and surge line index.

The demand fuel flow per unit compressor discharge pressure, $$\left.\frac{W_f}{P_4}\right|_D$$

is multiplied by a function ($f(P_4)$) proportional to sensed compressor discharge pressure, $P_4$, by a multiplier or gain-changer 102 to generate a fuel flow demand signal $W_{fD}$ for actuation of the turbofan fuel flow actuator. The fuel flow demand signal $W_{fD}$ itself may be subjected maximum and minimum limiting by element 294.

The auxiliary (jet) engine rotor speed control, represented in FIG. 5, is generally similar in mechanization to the turbofan high pressure rotor (turbine) speed control mechanization illustrated in FIGS. 9 and 10, and is therefore not shown in further detail.

Ancillary control of auxiliary engine turbine inlet temperature or discharge temperature may be required to effect optimum matching of the components of the integrated propulsion system during both dry and afterburner. Accordingly, an exemplary closed loop auxiliary engine turbine inlet temperature controller employing actuation of the nozzle area $A_{8x}$ of auxiliary engine exhaust nozzle 37 (in FIG. 4) may be provided, as shown in FIG. 13, although turbine discharge temperature control may be alternatively employed.

Figure 13:
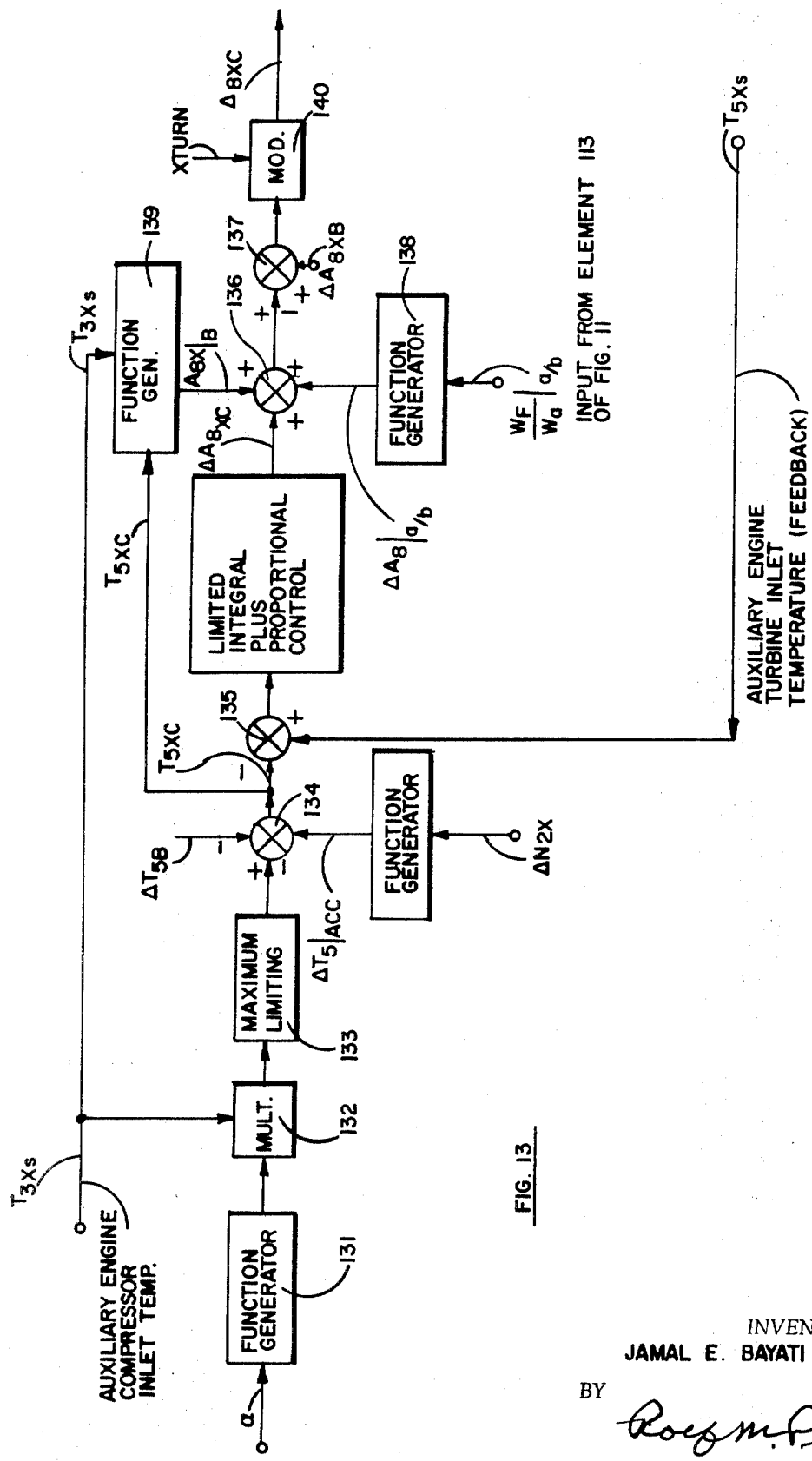
FIG. 13 is a block diagram of an exemplary closed loop turbine inlet temperature control mode for the auxiliary turbojet engine, included in the control arrangement of FIG. 5.

In the exemplary arrangement of FIG. 13, a function generator 131 responsive to command signal $\alpha$ generates a temperature ratio signal $$\left.\frac{T_5}{T_3}\right|_{XD}$$

of the turbine inlet temperature $T_{5X}$ to the compressor inlet temperature $T_{3X}$ as a preselected function of the normalized thrust demand. Such generated temperature ratio signal is then multiplied at multiplier 132 by the sensed auxiliary engine compressor inlet temperature $T_{3Xs}$ (utilized in compensation of the auxiliary engine rotor speer controller) to provide an auxiliary engine turbine inlet temperature demand $T_{5XD}$, which is subjected to maximum value limiting by signal limiter 133. Such limited signal may be biased or trimmed by a transient accommodation signal $\Delta T_{5B}$ and by an auxiliary engine rotor acceleration mode signal $\Delta T_5|_{ACC}$ applied to signal combining means 134. Such latter signal is computed from the speed control error signal $\Delta N_{2x}$ of the rotor speed control loop, since such error is a function of the rotor acceleration demand.

The output of signal combining means 134 is applied as a reference input $T_{5XC}$ to a closed loop temperature controller comprising differential signal combining means 135 which is further responsive to a feedback signal indicative of auxiliary engine turbine inlet temperature, $T_{5Xs}$ for providing a control signal $\Delta T_{5X}$ indicative of the difference therebetween. Such difference signal is employed by limited integral plus proportional control means 594 to generate a control signal $\Delta A_{8XC}$ for control of the nozzle area of the auxiliary engine exhaust nozzle 37 of FIG. 1 or FIG. 4 in such a sense as to vary temperature $T_{5Xs}$ as to tend to reduce the signal difference $\Delta T_{5X}$ to zero.

Control signal $\Delta A_{8XC}$ may be subjected to a number of biases injected at signal combining means 136 and 137 to provide a net control signal, $A_{8XC}$. A bias $A_{8X}|_B$ may be injected by a function generator 139 at summing means 136 as a function of the temperature demand $T_{5XC}$ and the compressor inlet temperature $T_{3Xs}$ to provide a nominal operating point corresponding to dry (non-afterburner) operation of the auxiliary engine. A compensatory second bias $\Delta A_8|_{a/b}$ may be injected at summing means 136 as a function of the afterburner fuel to air ratio $$\left.\frac{W_f}{W_a}\right|_{a/b}$$

Figure 11:
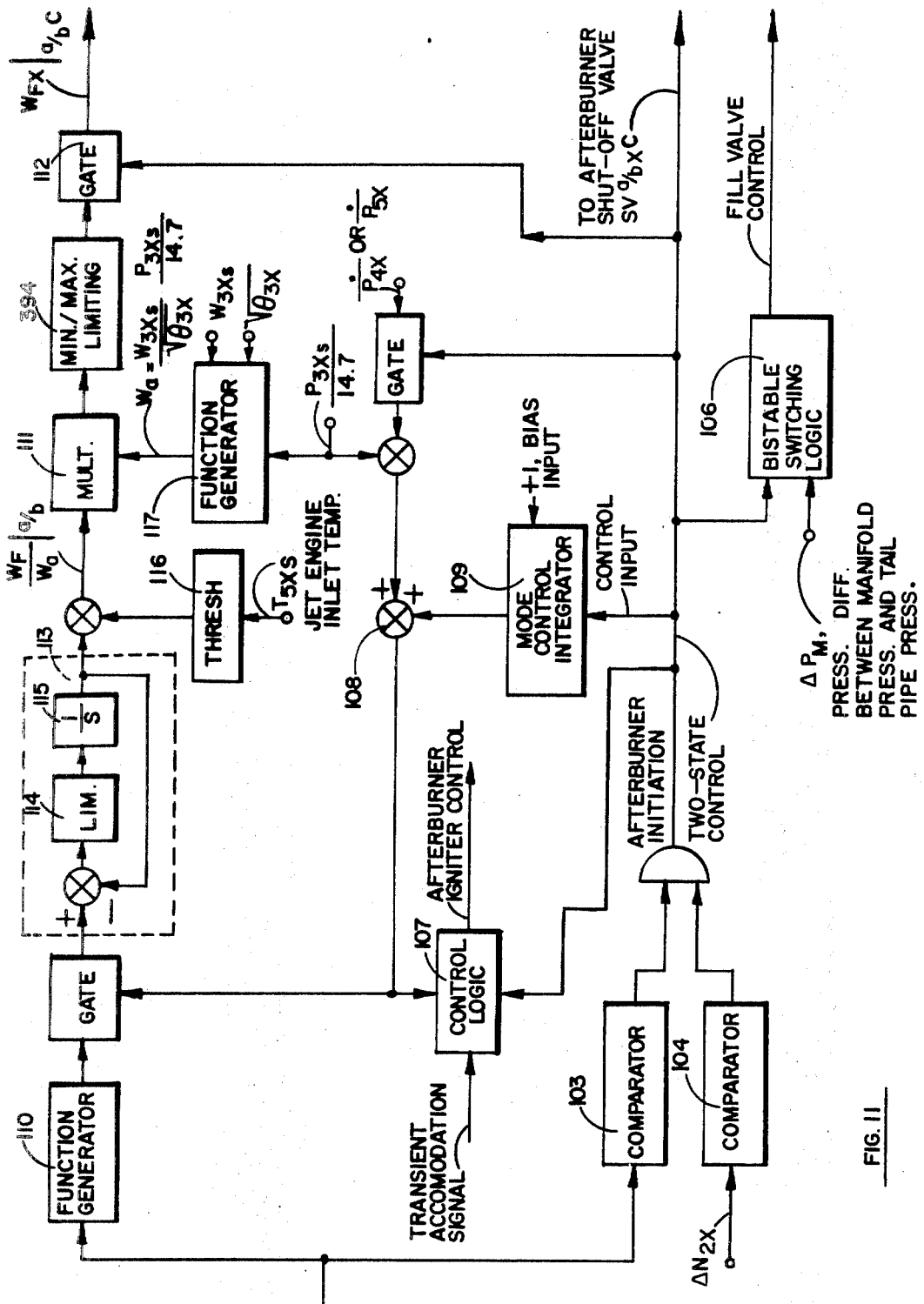
FIG. 11 is a block diagram of an exemplary afterburner control mode, included in the control arrangement of FIG. 5.

(which latter parameter is generated by element 113 in the afterburner controller of FIG. 11). Such compensatory bias varies somewhat as the square root of $$\left.\frac{W_f}{W_a}\right|_{a/b}$$

which function may be provided by function generator 138. A flow transient accommodation signal $\Delta A_{8XB}$ may be injected (at summing means 137) to enable necessary rapid reduction of the compressor pressure ratio in response to a transient condition. However, in view of the integrator action of integral and proportional control means 594, a sustained reduction in the compressor pressure ratio requires the injection of the temperature trim signal $\Delta T_{5B}$ at summing means 134.

When the auxiliary engine is not required to be either "windmilling" or operating, the auxiliary engine exhaust nozzle may be closed off by an override signal XTURN applied to modulation means 140 interposed at the output of summing means 137.

Thus, by means of the arrangement of FIG. 13 for the auxiliary engine, a prolonged increase in the compressor surge margin during a transient is provided by decreasing the compressor pressure ratio through the exhaust nozzle area, and necessary turbine temperature control is provided during both afterburner operation and dry (non-afterburner) operation.

With the auxiliary turbojet and primary turbofan engines of FIG. 1 or of FIG. 4 being operated in the military mode (in response to the command signal $\alpha$) and corresponding to plateau 75 in FIG. 6, further increments in thrust performance may be obtained by operation of the afterburner mode of the turbojet (auxiliary) engine in response to a further increment in the command signal $\alpha$, by means of the afterburner control mode of FIG. 5 shown more particularly in FIG. 11.

Referring to FIG. 11, there is illustrated in block diagram form an exemplary embodiment of the afterburner control mode of FIG. 5. There is provided control mode logic means responsive to a preselected magnitude of command signal $\alpha$ and to a preselected speed control error of the auxiliary engine speed controller for generating a two-state afterburner mode control signal. Such control mode logic means may include a first comparator 103 responsive to command signal $\alpha$ and a second comparator 104 responsive to a speed control error signal $\Delta N_{2X}$, as developed by an auxiliary engine compressor speed controller and corresponding to the input to element 186 in the mechanization of FIG. 9. Coincidence signalling means 105 responsively coupled to the outputs of comparators 103 and 104 provides an afterburner "on" signal in response to the coincidence of a value of $\alpha$ at least equal to a preselected value (see plateau 76 in FIG. 6) and a rotor speed error $\Delta N_{2X}$ within (less than) a preselected limit. If desired, an additional logic input (not shown) may be provided indicative of whether the turbine inlet temperature error is within specified limits. As in the logic control means of the other control modes, hysteresis is preferably included.

The two-state afterburner mode control signal output of coincidence means 105 is employed to initiate the afterburner mode by opening an afterburner shut-off valve (not shown) and a fill valve (not shown). The fill valve provides additional fuel to the afterburner manifold from the main fuel gear pump and is normally closed as the manifold pressure exceeds a limit indicating completion of the fill cycle. Accordingly, it may be desirable to employ the difference $\Delta P_m$ between the manifold and tail pipe pressures, as indicated by ancillary logic means 106, for monitoring and terminating the fill cycle.

In addition to opening of the afterburner shut-off valve and switching of the fill valve, the afterburner mode control signal is also used by further control logic 107 to energize the afterburner igniters. Such energization mode is terminated by control logic 107 upon afterburner ignition, indicated when either one of two events occurs. The first event is when $o/P_{4X}$, rate of compressor discharge pressure (following afterburner mode initation), exceeds a preselected positive limit (which limit is determined as a function of the compressor inlet pressure, $P_{3XS}$) as indicated at signal combining means 108. (If, for a given engine design, the turbine operates under choked conditions during afterburner operation, the turbine discharge pressure $P_{5XS}$ may preferably be used to indicate afterburner ignition.) The second event employed is a preselected elapsed time following afterburner mode initiation, an indication of which elapsed time or interval is provided by a control mode integrator 109 having a control input coupled to the output of coincidence means 105. To guard against loss of continuous ignition due to a flow transient condition in the absence of the aforementioned ignition logic signals, a transient accommodation signal input $T_X$ may be provided logic element 107, thus assuring continuous ignition during such a transient.

The indication of ignition (provided at the output of element 108) is employed to gate-on a function generator 110 responsive to a preselected range of values of command signal $\alpha$ for generating a signal indicative of a desired afterburner fuel flow per unit afterburner airflow, $$\left.\frac{W_f}{W_A}\right|_{a/b}$$

Such gated fuel to air ratio signal is multiplied or modulated at a multiplier 111 by a signal indicative of engine airflow $W_A$ to provide a fuel flow command signal $$W_F|_{a/bC}$$

which is subjected to maximum and minimum limiting by limiter 394. The output $W_{FX}|_{a/bC}$ of limiter 394 is gated-on by a gate 112 in response to the two-state afterburner mode initiation signal output from logic means 105. The gated-on afterburner fuel flow command $W_{FX}|_{a/bC}$ is initially at least a minimum value until the indication of afterburner initiation (at the output of element 108) gates-on the output of function generator 110.

A first order lag loop 113 with rate limiting means 114 is interposed between the gated output of function generator 110 and multiplier 111, and the rate limited output of loop 113 biased by a thresholded trim signal indicative of a jet engine turbine inlet over-temperature condition. The purpose of such first order lag (provided by an integrator 115 in closed loop arrangement), the rate limiting (provided by signal limiter 114 at the input to integrator 115) and the temperature trim signal input $T_{5XS}$, is to prevent over temperature conditions due to delays in the exhaust nozzle area actuator response relative to the afterburner fuel flow controller response. The threshold applied to temperature signal $T_{5XS}$ by element 116 is, of course, preselected from considerations of the normal temperature design limits of a specific engine design.

Where the compressor inlet corrected airflow $W_{3XS}$ is sensed and used for other control purposes, it may be convenient to compute the engine airflow $W_a$ (employed by multiplier 111) from $W_{3XS}$ in accordance with the relationship:

$$W_A = \frac{W_{3XS}}{\sqrt{\theta_{3X}}} \frac{P_{3XS}}{14.7}$$

where:

$P_{3X}$ = compressor inlet pressure $\sqrt{\theta_{3X}}$ = the square root of the normalized Rankine compressor inlet temperature, $T_{3XS}$.

Pressure, $P_{3X}$ may be sensed by a pressure transducer (not shown), while the term $\sqrt{\theta_3}$ corresponds to the like referenced input to block 47 in FIG. 9 and to block 99 in FIG. 10. The required computation function may be performed by a function generator 117. Such computing arrangement, in which the required airbleed is assumed to be derived from the turbofan engine (for instrumentation and cabin pressurization, for example), is useful because the turbofan engine is operational in all flight regimes or modes, and assumes that the afterburner airflow is equivalent to the jet engine compressor inlet air flow, where the jet engine compressor interstage airbleed is generally closed under military power conditions. In the several arrangements of FIGS. 7, 8, 9, 10, 11, 12 and 13, flow transient accommodation signal injection means have been provided, in order to better assure that the several performance parameters of the integrated propulsion system remain within acceptable limits during transient conditions, such as those caused by an aircraft maneuver, initiation of auxiliary engine start sequence, afterburner ignition and inlet unstart, to mention but a few. Such transient accommodation or compensatory bias signals may be computed as selected functions of the transient condition for insertion during the interval thereof, or may be preselected biases injected for preselected intervals in response to the initiation of a transient condition. The degree of sophistication required in a particular application may depend upon the range of flight conditions and type of vehicle. For example, a transport type vehicle may not be subjected to the range of transient flight conditions to which a fighter-type aircraft may be subjected, and therefore less sophisticated flight transient accommodation schemes may suffice.

Over the service life of the integrated propulsion system, the thrust performance for a given combination or set of engine settings and flight conditions will ordinarily vary from one flight to the next, due to engine wear and difference in engine overhaul conditions. In practice, more consistent propulsion system performance from one flight to the next requires minimization of compressor airflow variations under like operating conditions. It has been the practice in the prior art to effect such minimization of compressor air flow variation by accurate open loop control of the compressor stator vane angles as an open loop function of compressor corrected speed. However, such open loop control does not reduce the air flow deviation to as low as a desired limit of 2%. Such improved accuracy may be sought, however, through a closed loop air flow control system utilized in conjunction with the open-loop arrangement (and including temperature compensation) for control of the angular orientation of compressor stator vanes.

Although the controllers of the disclosed multiple loop control system have been described and illustrated generally in terms of analog elements, it is to be understood that the scope of the invention is not so limited and that the use of digital elements is also contemplated, or even a hybrid system combining both analog and digital techniques. In many applications a digital mechanization may be preferred in that sampled data techniques may be employed as to allow time-sharing of high speed computational equipments common to a number of control loops, as to reduce the overall equipment weight and space in an airborne application.

Accordingly, there has been described an automatic control system for optimum utilization of an integrated aircraft propulsion system.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An aircraft engine propulsion control system, for controlling a multi-mode aircraft propulsion system having adjustable parameters including a variable inlet duct, an air collector duct having a variable bypass exhaust area, a primary gas generator having a variable exhaust area and an auxiliary gas generator having a variable exhaust area, and comprising in combination computer means adapted to be responsive to a selected one of a plurality of engine operating modes of said multi-mode aircraft propulsion system and to the respective states of the primary gas generator, the air collector duct and the areas of: the variable area inlet duct, the air collector duct bypass exhaust, auxiliary gas generator exhaust of said engine, for providing mutually related first and second nozzle area control signals, fuel flow control signals and inlet duct control signals in accordance with that set of a plurality of preselected sets of parametric relationships defining said plurality of engine operating modes;

nozzle area regulating means responsive to said computer means for varying the areas of said bypass duct exhaust and said auxiliary gas generator exhaust; and engine operation regulating means responsive to said computer means for changing the operation of said primary and auxiliary engines in accordance with said selected engine operating mode.

2. The device of claim 1 in which there is further included manually-operable control signal means for generating a command signal indicative of a selected thrust condition of said propulsion system; and a plurality of thresholded closed-loop controllers responsive to preselected levels of said command signal for operation and control of said gas generators in preselected operating modes.

3. The device of claim 1 in which one of the said thresholded closed loop controllers includes means for rotor speed control of the primary gas generator in a preselected one of a high pressure and low pressure condition, and comprises first function generator means responsively coupled to said control signal means for providing an upper and lower limited demand signal corresponding to a rotor speed demand; and first limited integral plus proportional signalling means responsive to the difference between the rotor speed of said primary gas generator and said rotor speed demand for providing a fuel flow demand signal for excitation of a fuel flow actuator of said primary gas engine.

4. The device of claim 3 in which there is further provided means for maximum and minimum limiting of said fuel flow demand signal.

5. The device of claim 3 in which there is further provided function generator means interposed at the output of said first limited integral plus proportioned signalling means for compensatorily adjusting the gain of said fuel flow demand signal as a function of at least primary engine tailpipe temperature.

6. The device of claim 5 in which there is further included means for maximum and minimum limiting of said compensated fuel flow demand signal.

7. The device of claim 5 in which said further function generator means includes means for compensatorily adjusting said speed demand signal as a function of primary engine turbine inlet temperature.

8. An aircraft propulsion control system for controlling a multi-mode aircraft propulsion system having at least a variable inlet duct, an air collector duct having a variable bypass exhaust area, a primary gas generator having a variable exhaust area and at least one auxiliary gas generator having a variable exhaust area, and comprising in combination:

manually-operable signalling means for generating a command signal indicative of a selected thrust condition of said propulsion system; and a plurality of preselectively thresholded closed loop controllers responsive to preselected levels of said command signal for operation and control of said primary and auxiliary gas generators, alternatively and concomitantly, whereby a wide range of thrust control may be effected over both subsonic and supersonic flight conditions;

one of said closed loop controllers including means for rotor speed control of one of said primary and auxiliary gas generators in at least one of a high pressure and low pressure condition and comprising compensated first function generator means responsive to said command signal for providing a speed control reference signal corresponding to a speed demand within the usual operating speed limits of said engine under said pressure condition;

control loop signalling means responsive to said speed demand signal and adapted to be further responsive to an engine speed feedback signal as inputs for generating an engine fuel flow demand signal as a function of the difference between the signal inputs thereto; and compensatory biasing means interposed between said first function generator and said control loop signalling means for biasing said speed demand signal.

9. An aircraft propulsion control system for controlling a multi-mode aircraft propulsion system having at least a variable inlet duct, an air collector duct having a variable bypass exhaust area, a primary gas generator having a variable exhaust area and at least one auxiliary gas generator having a variable exhaust area, and comprising in combination:

manually-operable signalling means for generating a command signal indicative of a selected thrust condition of said propulsion systems; and a plurality of preselectively thresholded closed loop controllers responsive to preselected levels of said command signal for operation and control of said primary and auxiliary gas generators, alternatively and concomitantly, whereby a wide range of thrust control may be effected over both subsonic and supersonic flight conditions, and including means for controlling a fan type primary gas engine having a controllable fuel flow and a controllable exhaust nozzle area and for further controlling a jet type auxiliary gas engine having a controllable fuel flow and controllable after burner mode, comprising a first closed loop engine speed controller having a function generator responsive to said signalling means for generating a reference signal as a selected function of a predetermined range of values of the output of said signalling means for controlling the low-pressure fan speed of a fan engine by variation of the fan engine primary nozzle exhaust area;

a second closed loop engine speed controller having a function generator responsive to said signalling means for generating a reference signal as a selected function of a predetermined range of values of the output of said signalling means for controlling the compressor speed of said fan engine by variation of the fan engine fuel flow;

a third closed loop engine speed controller having a function generator responsive to said signalling means for generating a reference signal as a selected function of a predetermined range of values of said ouput of said signalling means for controlling the engine speed of a jet engine by variation of the jet engine fuel flow; and a fourth engine controller having a function generator responsive to said signalling means for generating a reference signal as a selected function of a predetermined range of values of said output of signalling means for controlling the afterburner mode of said jet engine.

10. An aircraft propulsion control system for controlling a multi-mode aircraft propulsion system having at least a variable inlet duct, an air collector duct having a variable bypass exhaust area, a primary gas generator having a variable exhaust area and at least one auxiliary gas generator having a variable exhaust area, and comprising in combination:

manually-operable signalling means for generating a command signal indicative of a selected thrust condition of said propulsion system; and a plurality of preselectively thresholded closed loop controllers responsive to preselected levels of said command signal for operation and control of said primary and auxiliary gas generators, alternatively and concomitantly, whereby a wide range of thrust control may be effected over both subsonic and supersonic flight conditions, one of said closed loop controllers including means for rotor speed control of one of said primary and auxiliary gas generators in at least one of a high pressure and low pressure condition and comprising compensated first function generator means responsive to said command signal for providing a speed control reference signal corresponding to a speed demand within the usual operating speed limits of said engine under said pressure condition;

control loop signalling means responsive to said speed demand signal and adapted to be further responsive to an engine speed feedback signal as inputs for generating an engine fuel flow demand signal as a function of the difference between the signal inputs thereto; and compensated second function generator means interposed at the output of said control loop signalling means for providing a fuel flow reference signal corresponding to a fuel flow demand within the usual operating limits of said engine under said pressure condition, including compensation for the ratio $W_f/P_4$, of control fuel flow per unit compressor discharge pressure.

11. An aircraft propulsion control system for controlling a multi-mode aircraft propulsion system having at least a variable inlet duct, an air collector duct having a variable bypass exhaust area, a primary gas generator having a variable exhaust area and at least one auxiliary gas generator having a variable exhaust area, and comprising in combination:

manually-operable signalling means for generating a command signal indicative of a selected thrust condition of said propulsion system; and a plurality of preselectively thresholded closed loop controllers responsive to preselected levels of said command signal for operation and control of said primary and auxiliary gas generators, alternatively and concomitantly, whereby a wide range of thrust control may be effected over both subsonic and supersonic flight conditions, one of said closed loop controllers including means for rotor speed control of one of said primary and auxiliary gas generators in at least one of a high pressure and low pressure condition, and comprising compensated first function generator means responsive to said command signal for providing a speed control reference signal corresponding to a speed demand within the usual operating speed limits of said engine under said pressure condition;

control loop signalling means responsive to said speed demand signal and adapted to be further responsive to an engine speed feedback signal as inputs for generating an engine fuel flow demand signal as a function of the difference between the signal inputs thereto; and compensated second function generator means interposed at the output of said control loop signalling means for providing a fuel flow reference signal corresponding to a fuel flow demand within the usual operating limits of said engine under said pressure condition, including compensation for the Mach number factor formed by the ratio of the Rankine temperature of the compressor inlet to that of the standard atmosphere.

12. An aircraft propulsion control system for controlling a multi-mode aircraft propulsion system having at least a variable inlet duct, an air collector duct having a variable bypass exhaust area, a primary gas generator having a variable exhaust area and at least one auxiliary gas generator having a variable exhaust area, and comprising in combination:

manually-operable signalling means for generating a command signal indicative of a selected thrust condition of said propulsion system; and a plurality of preselectively thresholded closed loop controllers responsive to preselected levels of said command signal for operation and control of said primary and auxiliary gas generators, alternatively and concomitantly, whereby a wide range of thrust control may be effected over both subsonic and supersonic flight conditions, one of said closed loop controllers including means for rotor speed control of one of said primary and auxiliary gas generators in at least one of a high pressure and low pressure condition, and comprising compensated first function generator means responsive to said command signal for providing a speed control reference signal corresponding to a speed demand within the usual operating speed limits of said engine under said pressure condition;

control loop signalling means responsive to said speed demand signal and adapted to be further responsive to an engine speed feedback signal as inputs for generating an engine fuel flow demand signal as a function of the difference between the signal inputs thereto; and compensated second function generator means interposed at the output of said control loop signalling means for providing a fuel flow reference signal corresponding to a fuel flow demand within the usual operating limits of said engine under said pressure condition, including compensation for the ratio $W_f/P_4$ of control fuel flow and for the Mach factor formed by the normalized Rankine temperature of the compressor inlet.

13. The device of claim 12 in which there is further provided compensatory biasing means for selectively biasing said speed demand signal.

14. An aircraft propulsion control system for controlling a multi-mode aircraft propulsion system having at least a variable inlet duct, an air collector duct having a variable bypass exhaust area, a primary gas generator having a variable exhaust area and at least one auxiliary gas generator having a variable exhaust area, and comprising in combination:

manually-operable signalling means for generating a command signal indicative of a selected thrust condition of said propulsion system; and a plurality of preselectively thresholded closed loop controllers responsive to preselected levels of said command signal for operation and control of said primary and auxiliary gas generators, alternatively and concomitantly, whereby a wide range of thrust control may be effected over both subsonic and supersonic flight conditions, one of said closed loop controllers including means for low pressure rotor speed control of one of said primary and auxiliary engines and comprising compensated first function generator means responsive to said command signal for providing a speed control reference signal corresponding to a speed demand within the usual operating speed limits of said engine;

control loop signalling means responsive to said speed demand signal and adapted to be further responsive to an engine speed feedback signal as inputs for generating an engine exhaust nozzle area demand signal as a function of the difference between the signal inputs thereto; and compensatory biasing means interposed between said first function generator and said control loop signalling means for selectively biasing said speed demand signal.

15. The device of claim 14 in which there is provided closed loop control signalling means selectively responsive to the position deviation of a terminal shock wave condition from a reference position in an air inlet duct of said propulsion system for compensatorily modulating said speed control reference signal to reduce said deviation.

16. The device of claim 14 in which there is provided control signalling means selectively responsive to the position deviation of a terminal shock wave condition from a reference position in an air inlet duct of said propulsion system for compensatorily varying both the bypass airflow through a bypass duct and the gain of said speed control reference signal to reduce said deviation.

17. An aircraft propulsion control system for controlling a multi-mode aircraft propulsion system having at least a variable inlet duct, an air collector duct having a variable bypass exhaust area, a primary gas generator having a variable exhaust area and at least one auxiliary gas generator having a variable exhaust area, and comprising in combintion:

manually-operable signalling means for generating a command signal indicative of a selected thrust condition of said propulsion system; and a plurality of preselectively thresholded closed loop controllers responsive to preselected levels of said command signal for operation and control of said primary and auxiliary gas generators, alternatively and concomitantly, whereby a wide range of thrust control may be effected over both subsonic and supersonic flight conditions, one of said closed loop controllers including means for speed control of a rotor of said auxiliary gas generator and in which there is further included means for controlling an afterburner mode of said auxiliary gas generator, comprising control mode logic means responsive to a preselected magnitude of said command signal and to a preselected speed control error of said auxiliary gas generator for generating a two state afterburner mode control signal;

a function generator responsive to said command signal for generating an afterburner fuel flow to airflow ratio demand signal, a gated modulating means having a gate control input responsive to said afterburner mode control signal, said gated modulating means being further responsive to said ratio demand signal and to air flow through said auxiliary gas generator for generating a gated control signal for control of the afterburner fuel flow of said auxiliary gas generator.

18. The device of claim 17 in which there is further provided thresholded bias injection means responsive to one of the turbine inlet and discharge temperatures of said auxiliary gas generator for compensatory biasing of said ratio demand signal.

19. The device of claim 17 in which said gated modulating means includes computing means responsive to the compressor inlet pressure and compressor inlet temperature of the auxiliary engine for computing the afterburner mode airflow.

20. The device of claim 17 in which said gated modulating means includes computing means responsive to the compressor inlet pressure, compressor inlet temperature and compressor corrected airflow for computing the afterburner airflow.

21. The device of claim 17 in which one of said closed loop controllers includes means for speed control of a rotor of said auxiliary gas generator and in which there is further provided means for controlling an afterburner mode of said auxiliary gas generator, comprising control mode logic means responsive to a preselected magnitude of said command signal and to a preselected speed control error of said auxiliary gas generator rotor for generating a two state afterburner mode control signal;

a gated compressor inlet temperature compensated function generator responsive to said command signal and to auxiliary gas generator airflow for providing a gated afterburner fuel flow demand control signal, said gated function generator further having a gate control input responsive to said afterburner mode control signal.

22. The device of claim 21 in which there is further provided means for maximum and minimum limiting of said gated afterburner fuel flow demand control signal.

23. The device of claim 21 in which there is further provided means responsive to said afterburner control mode signal for providing an afterburner igniter control signal having at least a preselected duration interval.

24. An aircraft propulsion control system for controlling a multi-mode aircraft propulsion system having at least a variable inlet duct, an air collector duct having a variable bypass exhaust area, a primary gas generator having a variable exhaust area and at least one auxiliary gas generator having a variable exhaust area, and comprising in combination:

manually-operable signalling means for generating a command signal indicative of a selected thrust condition of said propulsion system; and a plurality of preselectively thresholded closed loop controllers responsive to preselected levels of said command signal for operation and control of said primary and auxiliary gas generators, alternatively and concomitantly, whereby a wide range of thrust control may be effected over both subsonic and supersonic flight conditions, one of said closed-loop controllers including means for generating a control signal indicative of the speed deviation of a rotor of an auxiliary engine from a reference speed condition and in which there is further provided temperature control means for controlling the temperature of said auxiliary engine and comprising compensated function generator means responsive to said command signal for providing an auxiliary gas generator turbine inlet reference temperature signal corresponding to a temperature within the usual operating temperature limits of said auxiliary gas generator;

compensatory biasing means for biasing said reference temperature control signal as a function of said control signal indicative of the speed deviation of said auxiliary engine rotor; and control loop signalling means responsive to said biased reference temperature signal and adapted to be further responsive to an auxiliary engine turbine inlet temperature feedback signal for generating an auxiliary engine exhaust nozzle control signal as a function of the difference between said biased reference and feedback signals.

References Cited

UNITED STATES PATENTS

| | | | |
|---|---|---|---|
| 3,395,534 | 8/1968 | Owen | 60—39.29 |
| 3,395,538 | 8/1968 | Borel | 60—243 |
| 3,469,395 | 9/1969 | Spitsbergen | 60—39.28 |
| 3,472,027 | 10/1969 | Snow | 60—236 |
| 2,805,542 | 9/1957 | Boykin | 60—238 |
| 3,103,102 | 9/1963 | Sargent | 60—224 |
| 3,149,461 | 9/1964 | Eichholtz | 60—225 |
| 3,401,524 | 9/1968 | Urban | 60—224 |

CARLTON R. CROYLE, Primary Examiner

D. HART, Assistant Examiner

U.S. Cl. X.R.

60—39.15, 238, 239, 240